(12) United States Patent
Cole et al.

(10) Patent No.: US 12,726,007 B2
(45) Date of Patent: Sep. 1, 2026

(54) STRIPPING TOOL

(71) Applicant: Emerson Professional Tools, LLC, Elyria, OH (US)

(72) Inventors: Alex M. Cole, Columbia Station, OH (US); Billy Odon M. Yrad, Jr., Amherst, OH (US); Donald M. Embree, Akron, OH (US); John Russell Fenske, Love's Park, IL (US); Qi Zhou, Shanghai (CN); Jinan Chen, Shanghai (CN); Kuo Wu, Shanghai (CN)

(73) Assignee: Emerson Professional Tools, LLC, Elyria, OH (US)

( * ) Notice: Subject to any disclaimer, the term of this patent is extended or adjusted under 35 U.S.C. 154(b) by 0 days.

(21) Appl. No.: 18/872,577

(22) PCT Filed: Jun. 8, 2023

(86) PCT No.: PCT/US2023/068122
§ 371 (c)(1),
(2) Date: Dec. 6, 2024

(87) PCT Pub. No.: WO2023/240181
PCT Pub. Date: Dec. 14, 2023

(65) Prior Publication Data

US 2025/0372967 A1 Dec. 4, 2025

(30) Foreign Application Priority Data

Jun. 8, 2022 (CN) ......................... 202210641536.6
Jun. 8, 2022 (CN) ......................... 202221420057.3

(51) Int. Cl.
*H02G 1/12* (2006.01)

(52) U.S. Cl.
CPC ......... *H02G 1/1224* (2013.01); *H02G 1/1239* (2013.01)

(58) Field of Classification Search
USPC .................................................... 30/90.3, 271
See application file for complete search history.

(56) References Cited

U.S. PATENT DOCUMENTS 2,031,470 A * 2/1936 Eck ...................... H02G 1/1297 30/372
2,551,401 A * 5/1951 Underhill ............. H02G 1/1297 7/107

(Continued)

FOREIGN PATENT DOCUMENTS

| | | | |
|---|---|---|---|
| CN | 207572868 | U | 7/2018 |
| CN | 106711737 | B | 11/2018 |
| CN | 214798610 | U | 11/2021 |

OTHER PUBLICATIONS

Search report and office action issued in connection with CN application No. 202380052180.5 dated Dec. 6, 2025, 22 pages.

(Continued)

*Primary Examiner* — Hwei-Siu C Payer
(74) *Attorney, Agent, or Firm* — Hanley, Flight & Zimmerman, LLC

(57) ABSTRACT

A stripping tool for an armor-wrapped cable is provided, which includes a first handle and a second handle. The first handle includes a cutting portion, a pivoting portion and a gripping portion. The second handle includes a clamping portion, a pivoting portion and a gripping portion. The first handle and the second handle are pivotally connected at the pivoting portion of the first handle and the pivoting portion of the second handle, so that the user can pivot the second handle relative to the first handle by holding the gripping portion of the first handle and the gripping portion of the second handle, so as to clamp the armor-wrapped cable (Continued)

between the cutting portion of the first handle and the clamping portion of the second handle, and cut the cable by the cutting portion of the first handle.

31 Claims, 35 Drawing Sheets

(56) References Cited

U.S. PATENT DOCUMENTS

| | | | | | |
|---|---|---|---|---|---|
| 3,047,949 | A | * | 8/1962 | Golightly | A01G 3/02 30/271 |
| 3,283,404 | A | * | 11/1966 | Hickman | H02G 1/1214 30/91.2 |
| 4,439,923 | A | * | 4/1984 | Scranton | B26B 13/26 30/252 |
| 4,557,164 | A | | 12/1985 | Krampe | |
| 4,932,124 | A | | 6/1990 | Pyun | |
| 8,112,893 | B2 | | 2/2012 | Harger | |
| 2008/0173137 | A1 | | 7/2008 | Farrell | |
| 2019/0245332 | A1 | * | 8/2019 | Jackson | H02G 1/16 |
| 2025/0372967 | A1 | * | 12/2025 | Cole | H02G 1/1224 |

OTHER PUBLICATIONS

International Search Report and Written Opinion issued in connection with PCT application No. PCT/US2023/068122 dated Oct. 4, 2023, 9 pages.

* cited by examiner

STRIPPING TOOL

FIELD

The present application relates to a stripping tool, in particular to a stripping tool for stripping armor-wrapped cables (MC/BX cables).

BACKGROUND

This section only provides background information relating to the present application, which may not necessarily constitute the prior art.

Armor-wrapped cables are widely used in the construction/power industry. The outer protective casing of the cable is formed by winding metal sheathing. Due to this design, the cable is protected well and can be bent almost freely. This outer protective casing is generally formed by winding aluminum wires and is relatively rigid, making it difficult to remove the protective casing of an end of the cable for using the cable.

Cutting the winding wires of the protective casing with commonly used tools such as wire cutters and rotary cutters is time-consuming and labor-intensive. In particular, wire cutters or rotary cutters may require enormous holding force to operate. In addition, existing wire cutters or other general-purpose cutting tools are not ergonomically shaped and have unshielded cutter tips. Furthermore, wire cutters or rotary cutters have complex structures, so that a long time for cable installation is required, and the cables easily depart from the cutting area. Moreover, the cutting depth of the general-purpose tools is not easy to control, and it is easy to damage the insulation layers of the inside metal wires. Additionally, during cutting, deformation may occur at ends of the metal protective casing which causes difficulties during installation of electrical fittings with the cable.

On the other hand, only a few tools can accommodate large diameter armor-wrapped cables. Existing tools with compact design are not suitable for cutting large armor-wrapped cables. Most existing cutting tools have a maximum outer diameter of one inch.

SUMMARY

An object of the present application is to solve one or more of the above technical problems.

A labor-saving and easy-to-operate stripping tool for an armor-wrapped cable is provided.

In particular, a stripping tool suitable for cables of various diameters including large-diameter cables is provided.

In particular, a stripping tool for an armor-wrapped cable with a uniform cutting force is provided.

In particular, a stripping tool capable of adjusting cutting depth so as not to damage the inside metal wires is provided.

In particular, a stripping tool capable of adjusting relative pivot positions of two handles of the stripping tool is provided.

In particular, a safe stripping tool for an armor-wrapped cable is provided.

In particular, a stripping tool capable of cutting the inside metal wires of the armored cable and stripping the insulation layers of the metal wires is provided.

According to one aspect of the present application, a stripping tool for an armor-wrapped cable is provided, which includes a first handle and a second handle. The first handle includes a cutting portion, a pivoting portion and a gripping portion. The second handle includes a clamping portion, a pivoting portion and a gripping portion. The first handle and the second handle are pivotally connected at the pivoting portion of the first handle and the pivoting portion of the second handle, so that the user can pivot the second handle relative to the first handle by holding the gripping portion of the first handle and the gripping portion of the second handle, so as to clamp the armor-wrapped cable between the cutting portion of the first handle and the clamping portion of the second handle, and cut the cable by the cutting portion of the first handle. With this arrangement of the first handle and the second handle, the clamping force that the user needs to apply when cutting the cable can be reduced due to the lever principle. It is also convenient for the user's arm, in addition to the wrist and fingers, to exert force.

According to one aspect of the present application, a "V"-shaped opening protruding laterally toward the gripping portion of the second handle is formed in the clamping portion of the second handle of the stripping tool. In this way, the cable can be fixed so as not to deviate from a cutting position, and the inside of the cable can be prevented from being cut.

According to one aspect of the present application, one or more ribs are provided in the "V"-shaped opening of the clamping portion, which match the outer shape of the cable and are arranged side by side. In this way, the time for clamping the cable and the time for cutting the cable can be reduced, the efficiency of processing the armor-wrapped cable can be improved, and the safety can be improved.

According to one aspect of the present application, the cutting portion of the first handle of the stripping tool includes a drive mechanism for driving a cutting blade. The drive mechanism includes a driveshaft, a first cam, a second cam and a driver. One end of the driveshaft is integrated or fixedly connected with the first cam, and another end of the driveshaft cooperates with the second cam. The first cam and the second cam have the same profile, and the first cam and the second cam are arranged to be driven by the driver to rotate in the same phase together. In this way, the deflection of the driveshaft can be avoided, and the drive mechanism can therefore work smoothly, improving the cutting performance.

According to an aspect of the present application, a first cam groove correspondingly cooperating with the first cam and a second cam groove correspondingly cooperating with the second cam are respectively formed on two sides of the cutting portion of the first handle. The first cam groove and the second cam groove are elongated grooves. During the rotation of the first cam and the second cam, a pair of side walls of the first cam groove and the second cam groove periodically abut against the cam surfaces of the first cam and the second cam, thereby driving the first cam, the second cam and the cutting blade 35 connected to the first cam to reciprocatingly translate while rotating.

According to one aspect of the present application, the cutting portion of the first handle of the stripping tool is provided with a spring-loading mechanism. The spring-loading mechanism includes a spring and an adjustment screw disposed in a through hole of the cutting portion. The through hole is perpendicular to the driveshaft, so that the spring abuts against the driveshaft at one end and applies the spring force towards the cable. The adjustment screw is screwed to a first end of the through hole and abuts against another end of the spring. In this way, the stripping tool can be adapted to users with different holding strengths, and the use efficiency is improved.

According to an aspect of the present application, the stripping tool further includes a cutting depth adjustment mechanism. The cutting depth adjustment mechanism includes a stop nut screwed to a second end of the through hole. The stop nut abuts against the driveshaft from a side opposite to the spring, limiting the movement range of the driveshaft in the up-down direction. The cutting depth of the cutting blade connected to the first cam can be varied by screwing the stop nut.

According to one aspect of the application, the driver includes a crank. One end of the crank is integrated or fixedly connected with the second cam, and another end of the crank is provided with a wheel. The wheel includes a bowl-shaped body and a cylindrical bushing. A wheel shaft is accommodated in the bushing of the wheel. A wheel fixing screw, through the wheel shaft, is configured to fix the wheel to an end of the crank in a rotatable manner. Multiple spare cutting blades can be stored in the body of the wheel. With this design, the stripping tool becomes compact and is easy to carry and use.

According to one aspect of the present application, the driver includes a motor.

According to one aspect of the present application, a spring is provided between the gripping portion of the second handle and the gripping portion of the first handle of the stripping tool. Therefore, the wire stripping mechanism is very labor-saving due to the biased open position when the handles are released.

According to one aspect of the present application, the stripping tool includes a position switching mechanism, and the pivoting portion of the first handle is pivotally connected to the pivoting portion of the second handle through the position switching mechanism. The position switching mechanism includes a position switching hole formed at the pivoting portion of the first handle, a position adjusting hole formed at the pivoting portion of the second handle, and a handle pivoting shaft passing through the position switching hole and the position adjusting hole, so that the first handle and the second handle can be located in two or more relative positions. Therefore, the stripping tool can be adapted to different cables and environments, and the applicability thereof is improved.

According to an aspect of the present application, the position switching hole of the position switching mechanism is dumbbell or peanut shaped, the position adjusting hole is oblong or oval, a shaft section of the handle pivoting shaft has an oblong or oval cross-section, and a threaded section formed at an end of the handle pivoting shaft is configured to cooperate with a fixing nut.

According to one aspect of the present application, the position switching hole of the position switching mechanism is an elongated through hole, multiple arc-shaped position switching grooves are provided on an inner side of the first handle, and an arc-shaped position adjusting protrusion is provided on an inner side of the second handle, and the position adjusting protrusion can be inserted into any one of the multiple position switching grooves and slide.

According to one aspect of the present application, the position switching hole of the position switching mechanism at the first handle is an elongated hole with internal teeth; the handle pivoting shaft includes a headed section and a shaft section, and the shaft section includes in sequence a small-diameter section, an outer-tooth section and a large-diameter section along a direction away from the headed section, and the outer-tooth section is engaged with the internal teeth; a preloaded spring abuts between the headed section of the handle pivoting shaft and the first handle, and the large-diameter section of the handle pivoting shaft is accommodated in the position adjusting hole of the second handle.

According to one aspect of the present application, a recessed portion which is open toward one side and a lower part is formed on one side of the cutting portion, the recessed portion is configured to accommodate the driveshaft, the first cam and the cutting blade, so that the edge of the cutting blade after installation is exposed only at the cutting position below, and is enclosed by side walls of the recessed portion in the remaining directions.

According to one aspect of the present application, a first wire stripping blade is provided on the first handle, a second wire stripping blade is provided on the second handle, and when the first handle and the second handle are clapped tight, the first wire stripping blade and the second stripping blade can shear the de-armored cable and strip an insulation layer of the cable.

According to an aspect of the present application, the first wire stripping blade and the second wire stripping blade are rectangular, a cutting blade is formed on one side of each of the first wire stripping blade and the second wire stripping blade, and a plurality of semicircular cutting edges gradually expanding from ends of the first and second wire stripping blades are provided along the length of the first wire stripping blade and the second wire stripping blade. The first wire stripping blade and the second wire stripping blade are such arranged that the cutting blade of the first wire stripping blade and the cutting blade of the second wire stripping blade face each other, and the cutting edges of the first wire stripping blade and the cutting edges of the second wire stripping blade are opposite to each other so that the cutting edges of the same size are paired.

According to one aspect of the present application, complete or partially circular holes are provided on opposite sides of the first wire stripping blade and the second wire stripping blade, so as to fix, with fasteners, the first wire stripping blade to the first handle and the second wire stripping blade to the second handle.

According to an aspect of the present application, the first wire stripping blade is provided on the cutting portion of the first handle, and the second wire stripping blade is provided on the clamping portion of the second handle.

According to one aspect of the present application, the first wire stripping blade is arranged on a side away from the cutting portion relative to the pivoting portion of the first handle, and the second wire stripping blade is arranged on a side away from the clamping portion relative to the pivoting portion of the second handle.

According to an aspect of the present application, a stripping tool for an armor-wrapped cable is provided, which includes a first handle including a cutting portion, a pivoting portion and a gripping portion, a second handle including a clamping portion, a pivoting portion and a gripping portion, the first handle and the second handle being pivotally coupled at the pivoting portions with the gripping portions being held by a user so as to clamp the armor-wrapped cable between the cutting portion and the clamping portion and cut the cable by the cutting portion, the cutting portion including a rotatable cutting blade; and a drive mechanism on the cutting portion and configured to drive the cutting blade, the drive mechanism including a driveshaft, a first cam at a first end of the driveshaft, a second cam at a second end of the driveshaft and a crank, the first and second cams having the same profile and rotate in the same phase together, the crank having a central hub coupled to the driveshaft and first and second wings extending outward from the hub, and wherein a user grasps the wings to rotate the crank.

According to aspects of the present application, each wing is approximately two to three inches long, and each wing has a plurality of gripping ribs thereon.

According to an aspect of the present application, a "V"-shaped opening protruding laterally toward the gripping portion of the second handle is formed in the clamping portion, and the cutting blade above the "V"-shaped opening in use. According to a further aspect of the present application, tone or more ribs are provided in the "V"-shaped opening of the clamping portion which match an outer shape of the cable and are arranged side by side.

According to one aspect of the present application, the stripping tool includes a fine position adjustment mechanism configured to prevent further movement of the first and second handles toward each other when the gripping portions are grasped by the user and brought toward each other, the fine position adjustment mechanism including a body rotatably mounted on the cutting portion of the first handle which engages with a surface of the clamping portion of the second handle when the handles are moved toward each other.

According to one aspect of the present application, the body of the fine position adjustment mechanism includes a plurality of teeth and the surface includes a plurality of teeth, wherein the teeth intermesh when the handles are moved toward each other.

According to yet another aspect of the present application, a front stop projection is provided on the cutting portion between the body and the cutting blade, and a rear stop projection is provided on the cutting portion between the body and the pivoting portion, the front and rear stop projections limiting the amount of rotation of the body relative to the cutting portion.

According to yet a further aspect of the present application, a first set of indicia is provided on a top surface of an extension section between the cutting portion and the pivoting portion of the first handle, and a second set of indicia is provided on the top surface of the extension section, wherein the body includes a finger section which is configured to align with the sets of indicia.

According to one aspect of the present application, the body of the fine position adjustment mechanism is a roller which is eccentrically mounted on the cutting portion.

According to yet a further aspect of the present application, one of the body of the fine position adjustment mechanism and the cutting portion includes a plurality of dimples, and the other of the body and the cutting portion includes a ball which is configured to be seated within one of the dimples depending upon the rotational position of the body relative to the cutting portion. The ball may be spring-loaded.

According to an aspect of the present application, a stripping tool for an armor-wrapped cable includes a first handle including a cutting portion, a pivoting portion and a gripping portion; a second handle including a clamping portion, a pivoting portion and a gripping portion, the first handle and the second handle being pivotally coupled at the pivoting portions with the gripping portions being held by a user so as to clamp the armor-wrapped cable between the cutting portion and the clamping portion and cut the cable by the cutting portion; the cutting portion including a rotatable cutting blade; and a position adjustment mechanism configured to prevent further movement of the first and second handles toward each other when the gripping portions are grasped by the user and brought toward each other, the fine position adjustment mechanism including a body rotatably mounted on the cutting portion of the first handle which engages with a surface of the clamping portion of the second handle when the handles are moved toward each other.

BRIEF DESCRIPTION OF THE DRAWINGS

The foregoing and additional features and characteristics of the present application will become clearer from the following detailed description with reference to the accompanying drawings, which are merely examples and are not necessarily drawn to scale. The same reference numerals are used in the drawings to indicate the same components, and in the drawings.

DETAILED DESCRIPTION OF THE EMBODIMENTS

The preferred embodiments of the present application will now be described in detail with reference to the accompanying drawings. The following description is merely exemplary in nature and is not intended to limit the present application and an application or use thereof.

Figure 1:
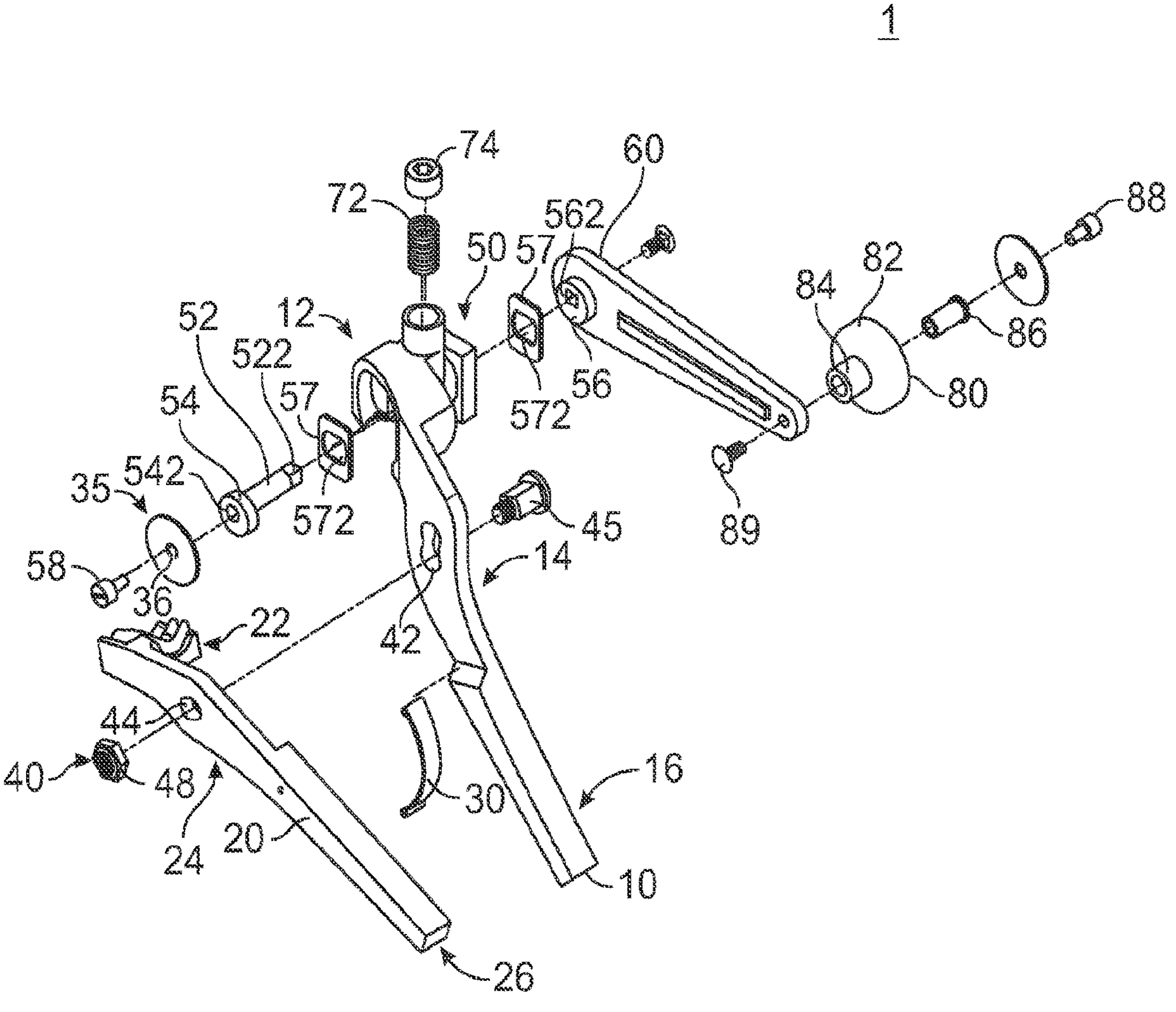
FIG. 1 is a perspective exploded view of a stripping tool according to an embodiment of the present application.

FIG. 1 is a perspective exploded view of a stripping tool 1 according to an embodiment of the present application. As shown in FIG. 1, a stripping tool 1 for an armor-wrapped cable C is provided according to the present application, which includes a first handle 10 and a second handle 20. The first handle 10 includes a cutting portion 12, a pivoting portion 14 and a gripping portion 16. The second handle 20 includes a clamping portion 22, a pivoting portion 24 and a gripping portion 26. The first handle 10 and the second handle 20 are pivotally connected at the pivoting portion 14 of the first handle 10 and the pivoting portion 24 of the second handle 20, so that the whole stripping tool 1 has an "X" shape. In other words, the pivoting portion 14 of the first handle 10 is located between the gripping portion 16 and the cutting portion 12, and the pivoting portion 24 of the second handle 20 is located between the gripping portion 26 and the clamping portion 22. During use, a user holds the gripping portion 16 of the first handle 10 and the gripping portion 26 of the second handle 20, and pivots the second handle 20 relative to the first handle 10, so as to clamp the armor-wrapped cable C between the cutting portion 12 of the first handle 10 and the clamping portion 22 of the second handle 20, and cut a protective casing of the armor-wrapped cable C by the cutting portion 12 of the first handle 10. With this arrangement of the first handle 10 and the second handle 20, the user can use the lever principle to cut the cable C not only with the power of the wrist and fingers, but also with the power of the arm, achieving a labor-saving technical effect. In addition, with this arrangement of the first handle 10 and the second handle 20, compared with the existing means that needs to remove the handle to load the cable C, the stripping tool 1 only needs to open the handles to load the cable C, thereby simplifying the loading method of the cable C. The stripping tool 1 can reduce the time for clamping the cable, facilitate operation, and improve the efficiency of cutting the armor-wrapped cable C.

Figure 2A:
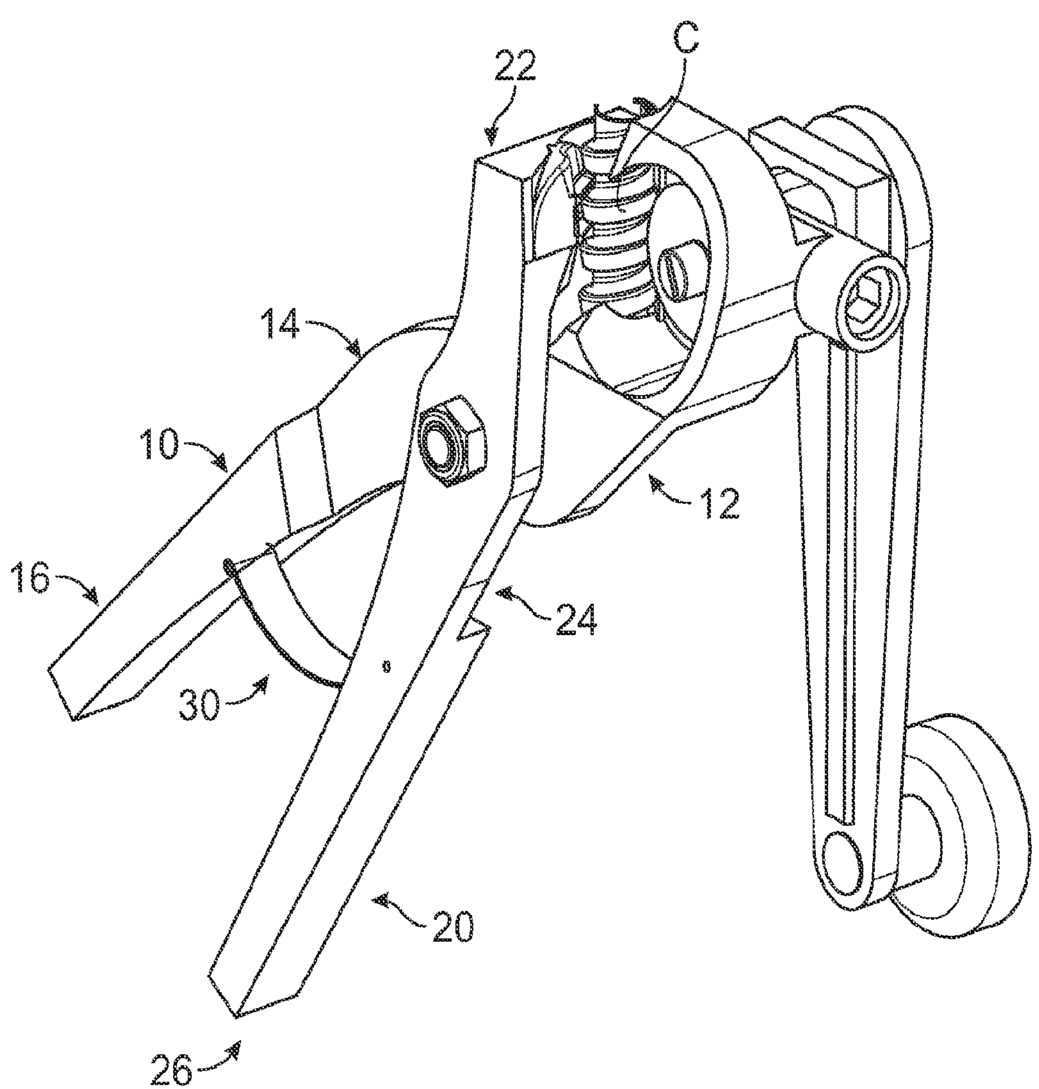
FIG. 2A is a perspective view of a cable clamping state of the stripping tool according to an embodiment of the present application.
Figure 2B:
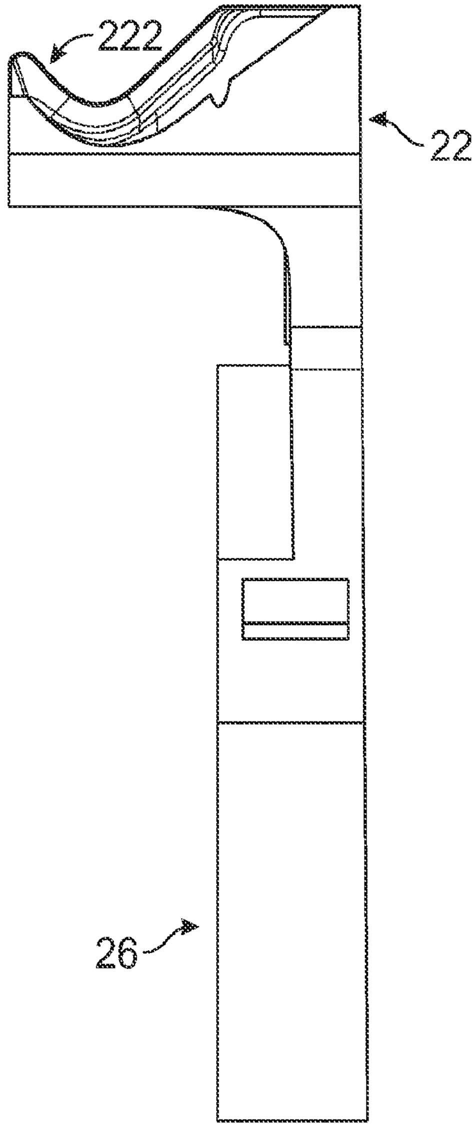
FIG. 2B is a schematic view of the head of a second handle of the stripping tool according to an embodiment of the present application.

As shown in FIG. 2A, the cable C to be cut can be held between the cutting portion 12 of the first handle 10 and the clamping portion 22 of the second handle 20, so as to hold and cut the cable C. Referring to FIG. 1 again, after the cable C is held between the cutting portion 12 and the clamping portion 22, a disc-shaped cutting blade 35 accommodated in the cutting portion 12 of the first handle 10 is driven by a crank 60, so that the cutting blade 35 is driven to rotate and translate back and forth along an extending direction of the cable C as described later, thereby cutting the armored metal portion of the cable C. The cutting blade 35 is accommodated in the cutting portion 12 of the first handle 10.

Various features of the stripping tool 1 will be described in detail below with reference to the accompanying drawings.

1. V-Shaped Cable Clamping Portion

FIGS. 2A to 2D illustrate a cable clamping state and corresponding features of the stripping tool 1 according to an embodiment of the present application. Specifically, in the embodiment shown in FIG. 2A and FIG. 2B, a "V"-shaped opening 222 opposing the cutting portion 12 of the first handle 10 is formed in the clamping portion 22 of the second handle 20 of the stripping tool 1. As shown in FIG. 2A, when the cable C is clamped in the stripping tool 1, the cable C can be placed in the "V"-shaped opening 222 of the clamping portion 22. As the outer diameter of the cable C varies, the cable C is placed at different depths in the "V"-shaped opening 222 of the clamping portion 22, thereby making the stripping tool 1 especially suitable for large armor-wrapped cables. Furthermore, the opening 222 can ensure that the stripping tool 1 holds the cable C stably so that the cutting blade is aligned with the center axis of the cable C.

Figure 2C:
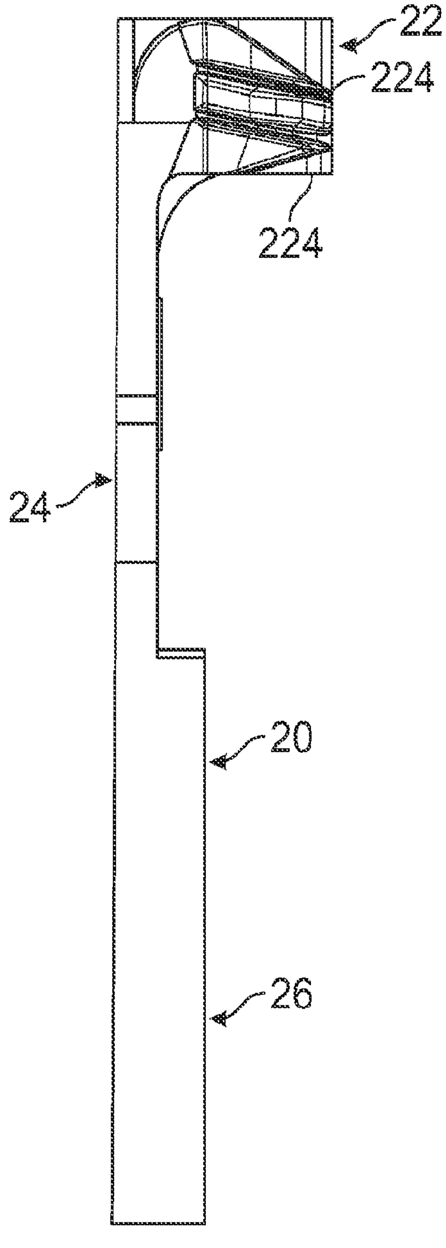
FIG. 2C is a schematic view of the second handle of the stripping tool according to an embodiment of the present application.

Preferably, as shown in FIG. 1 and FIG. 2C, one or more ribs 224 matching the profile of the cable C and arranged side by side are further on a clamping surface of the V-shaped opening 222 of the clamping portion 22 of the second handle 20 of the stripping tool 1.

Figure 2D:
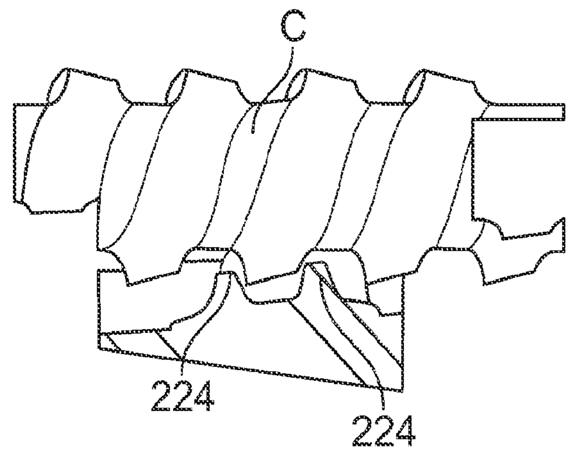
FIG. 2D is a partly sectional view of the stripping tool according to an embodiment of the present application, taken along an extending direction of the cable.

As shown in FIG. 2D, each rib 224 protrudes into a corresponding recessed portion of the corrugated outer surface of the cable C, thereby helping to hold the cable C in place and preventing movement of the cable C along the longitudinal axis of the cable C.

2. Drive Mechanism of a Dual-Cam

Figure 3:
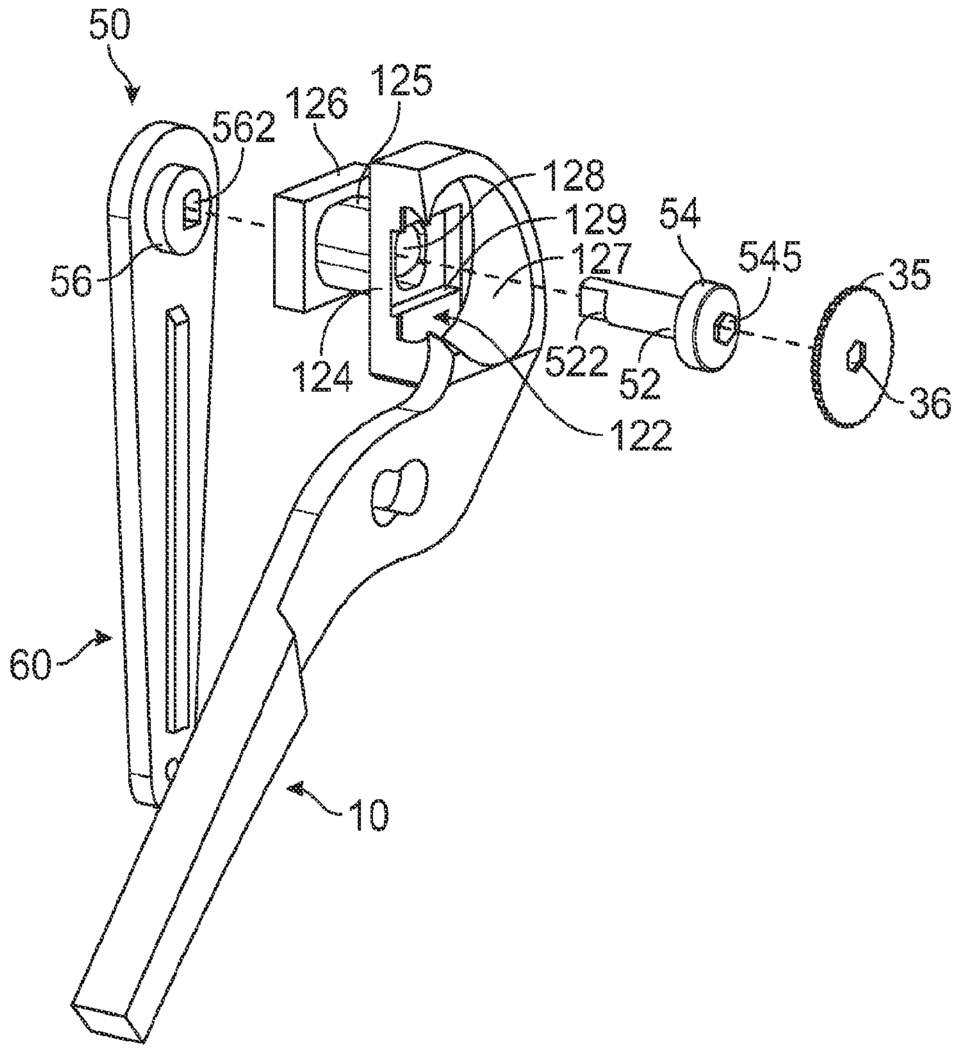
FIG. 3 is a perspective exploded view of a first handle of the stripping tool according to an embodiment of the present application.

FIG. 3 shows the first handle 10 of the stripping tool according to an embodiment of the present application. As shown in FIG. 3, the cutting portion 12 of the first handle 10 of the stripping tool 1 includes a drive mechanism 50. The drive mechanism 50 includes a driveshaft 52, a first cam 54, a second cam 56 and a driver as described herein. The first cam 54 and the second cam 56 are respectively located on two sides of the first handle 10. The driveshaft 52 passes through an elongated mounting hole 128 located at the bottom of the cutting portion 12. The size of the mounting hole 128 is larger than the diameter of the driveshaft 52, so that the driveshaft 52 can translate in the mounting hole 128 and move up and down. One end of the driveshaft 52 is integrated or fixedly connected with the first cam 54, and another end of the driveshaft 52 cooperates with the second cam 56. The first cam 54 and the second cam 56 have the same profile, and the first cam 54 and the second cam 56 are such arranged that they rotate in the same phase together. The second cam 56 may be formed at one end of the crank 60, and the crank 60 serves as the driver to drive the second cam 56, the driveshaft 52, the first cam 54, and the cutting blade 35 to rotate together. A flat part 522 is formed at the another end of the driveshaft 52. A flat hole 562 that is fitted with the flat part 522 of the driveshaft 52 is formed in the second cam 56, thereby enabling the first cam 54 and the second cam 56 to rotate together in the same phase. The cutting blade 35 may be connected to the first cam 54 in various ways. In the embodiment shown in FIG. 1, a threaded hole 542 is formed at a position of the first cam 54 corresponding to a rotational axis of the driveshaft 52. A cutter fixing screw 58 is screwed into the threaded hole 542 of the first cam 54 through a central hole 36 of the disc-shaped cutting blade 35. Thereby, the cutting blade 35 is fixed on a side, opposite to the driveshaft 52, of the first cam 54 so that the cutting blade 35 can rotate together with the driveshaft 52. In another embodiment shown in FIG. 3, a polygonal mounting protrusion 545 protruding along the rotational axis is provided on a side surface of the first cam 54, and the mounting protrusion 545 cooperates with a mounting hole 36 having a matching shape in the center of the cutting blade 35 to realize the connection.

As shown in FIG. 3, a recessed portion 127 which is open at a lower side is formed on a first side of the cutting portion 12 of the first handle 10, the recessed portion 127 is configured to accommodate the driveshaft 52, the first cam 54 and the cutting blade 35 connected with the first cam 54, so that the edge of the cutting blade 35 after installation is exposed only at a cutting position below, and is enclosed by side walls of the recessed portion 127 in the remaining directions. A first cam groove 122 corresponding to the first cam 54 is formed on an inner wall of the recessed portion 127. Correspondingly, as shown in the cross-sectional views of FIGS. 3 and 4, an extension part 125 and a mounting block part 126 located at an end of the extension part 125 extend from a second side of the cutting portion 12. A second cam groove 123 corresponding to the second cam 56 is formed on an outer surface of the mounting block part 126. As shown in the figure, the first cam groove 122 and the second cam groove 123 are rectangular grooves with the same shape. The profile of the first cam 54 and the profile of the second cam 56 are such designed that: during rotation, the first cam 54 respectively abuts against a pair of opposite side walls 124 (long sides of the rectangular first cam groove 122), perpendicular to the cable C, in the circumferential inner walls of the first cam groove 122, and does not contact with the other pair of side walls 129 of the rectangular first cam groove 122; similarly, during rotation, the second cam 56 respectively abuts against a pair of opposite side walls (long sides of the rectangular second cam groove 123), perpendicular to the cable C, in the circumferential inner walls of the second cam groove 123, and does not contact with the other pair of side walls of the rectangular second cam groove 123. Therefore, when the first cam 54 and the second cam 56 rotate together in the same phase, the first cam 54 and the second cam 56 will be intermittently pushed by the long side walls of the rectangular cam grooves 122, 123, so that the driveshaft 52 reciprocatingly translates in the extension direction of the cable C, and the cutting blade 35 reciprocates, while rotating, along the extension direction of the cable C to cut the armored metal portion of the cable C. The reciprocating movement increases the cutting range, making the cut more efficient and allows for a longer length of cut without increasing the depth of cut.

In an embodiment, the first cam 54 and the second cam 56 are embodied as eccentric wheels, that is, the wheel body itself is circular, but the driveshaft 52 is eccentrically installed with reference to the wheel body.

In addition, as shown in FIG. 1, a plurality of spacers 57 may be respectively provided between the first cam 54 and the inner side wall of the first cam groove 122, and between the second cam 56 and the inner side wall of the second cam groove 123. Additionally, the spacers 57 may provide a wear surface to prevent wear against the first and second cams 54, 56 and the cutting portion 12. The outer shape of the spacer 57 matches the circumferential inner wall 124 of the first cam groove 122 and the circumferential inner wall of the second cam groove 123. The spacer 57 is provided with an elongated through hole 572 that is consistent with the elongated mounting hole 128 at the bottom of the cutting portion 12, so as to allow the driveshaft 52 to pass through. When the first cam 54 and the second cam 56 rotate, the driveshaft 52 can reciprocatingly translate within the elongated through hole 572.

The dual-cam design of the present application enables the first cam 54 and the second cam 56 to be driven by the circumferential inner wall 124 of the first cam groove 122 and the circumferential inner wall of the second cam groove 123 respectively, so that the force on the driveshaft 52 is relatively uniform and balanced, and the deflection of the driveshaft 52 during the cutting process is reduced, thereby reducing the jamming of the stripping tool 1 during cutting and improving the efficiency of the cutting.

3. Spring-Loading Mechanism

Figure 4:
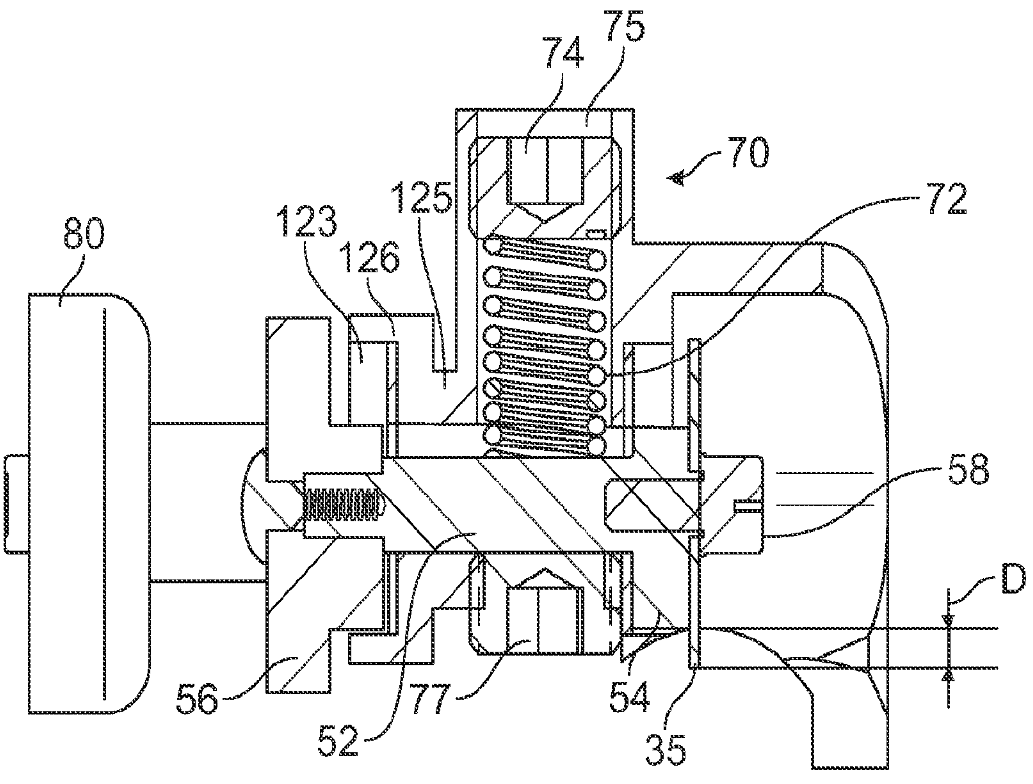
FIG. 4 is a partly sectional view of the first handle of the stripping tool according to an embodiment of the present application.

FIG. 4 is a partly sectional view of the first handle 10 of the stripping tool 1 according to an embodiment of the present application. As shown in FIG. 1 and FIG. 4, a spring-loading mechanism 70 is provided on the extension part 125 of the cutting portion 12 of the first handle 10 of the stripping tool 1. The spring-loading mechanism 70 includes a coil spring 72 and an adjustment screw 74. The spring 72 is provided in a through hole 75 perpendicular to the driveshaft 52 and abuts the driveshaft 52 with a second end to exert a spring force toward the cable C. Two ends of the through hole 75 are threaded, and the adjustment screw 74 is screwed on an upper end of the through hole and abuts against a first end of the spring 72 for changing the position of the spring 72 in the through hole 75. As shown in the figure, the driveshaft 52 passes through the cutting portion 12 of the first handle 10 of the stripping tool 1 and is supported by the cutting portion 12. The cutting blade 35 protrudes from the cutting portion 12 of the first handle 10 by a cutting depth D. When the cable C is clamped between the cutting portion 12 of the first handle 10 and the clamping portion 22 of the second handle 20, the cable C is clamped between the cutting blade 35 and the above-mentioned V-shaped opening 222 of the clamping portion 22 of the second handle 20. At the same time, the cable C exerts a reaction force on the cutting blade 35 against the elastic force of the spring 72, forcing the cutting blade 35 to retract a certain distance or retract completely into the interior of the cutting portion 12. As the cutting progresses, the cutting blade 35 is gradually extended into the cable due to the spring force until reaching the maximum cutting depth D.

Due to the arrangement of the spring-loading mechanism 70, the cutting force exerted by the cutting blade 35 of the stripping tool 1 on the cable C is constant, i.e., the spring force of the spring 72, even if the holding force exerted by the user varies. By screwing the adjustment screw 74, the amplitude of the spring force of the spring 72 can be changed, and when the adjustment screw 74 is screwed downwards, the spring 72 is compressed and the spring force is increased; conversely, by screwing the adjustment screw 74 upwards, the spring 72 is loosened and the spring force is reduced. As the cutting blade 35 wears, the adjustment screw 74 can be appropriately screwed to maintain a constant spring force. Therefore, the stripping tool 1 can provide a substantially uniform cutting force regardless of the user's hand strength, thereby improving cutting performance.

4. Cutting Depth Adjustment Mechanism

Still referring to FIG. 4, another end of the through hole 75 is provided with a stop nut 77 as a cutting depth adjustment mechanism. An end of the stop nut 77 abuts against the driveshaft 52 from a side opposite to the spring 72, thereby defining the maximum displacement of the up-and-down movement of the driveshaft 52, that is, the cutting depth D. When the stop nut 77 is screwed, the cutting depth D can be changed, that is, the cutting depth of the cutting portion 12 can be adjusted by the stop nut 77, so as to ensure that the cutting blade 35 can cut various types of cables without damaging the inner metal wires of the cable C.

5. Driver

Referring to FIG. 1 again, as described above, in an embodiment, the driver includes the crank 60. One end of the crank 60 is integrated or fixedly connected with the second cam 56. Another end of the crank 60 is provided with a wheel 80. The wheel 80 includes a bowl-shaped body 82 and a cylindrical bushing 84, alternatively, the wheel 80 may be knob shaped. A wheel shaft 86 is accommodated in the bushing 84 of the wheel 80. A wheel fixing screw 89 is connected to one end of the wheel shaft 86, so as to fix the wheel 80 to an end of the crank 60 in a rotatable manner. Therefore, the user drives the crank 60 to rotate around and together with the driveshaft 52 by holding the wheel 80, and drives the cutting blade 35 to rotate and translate simultaneously. One or more spare cutting blades 35 can be stored in the body 82 of the wheel 80. The spare cutting blades 35 are threaded together with a screw 88 and held at another end of the wheel shaft 86. For example only, up to five spare blades can be stored in the wheel 80.

Figure 5:
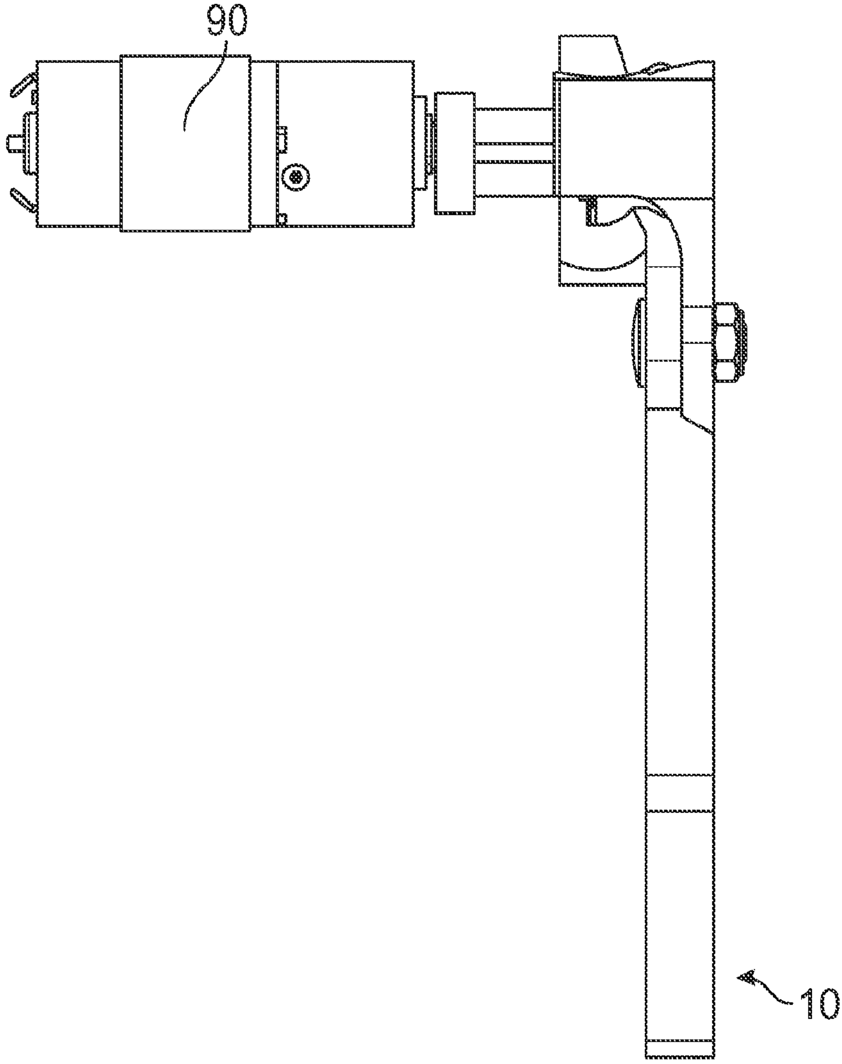
FIG. 5 is a perspective view of the stripping tool according to an alternative embodiment of the present application.

FIG. 5 is a perspective view of the stripping tool according to an alternative embodiment of the present application. As shown in FIG. 5, the driver may include a motor 90 instead of the crank 60, so as to electrically drive the cutting blade 35. The on/off and speed of the motor 90 can be controlled by specific buttons.

6. Position Switching Mechanism

Figure 6A:
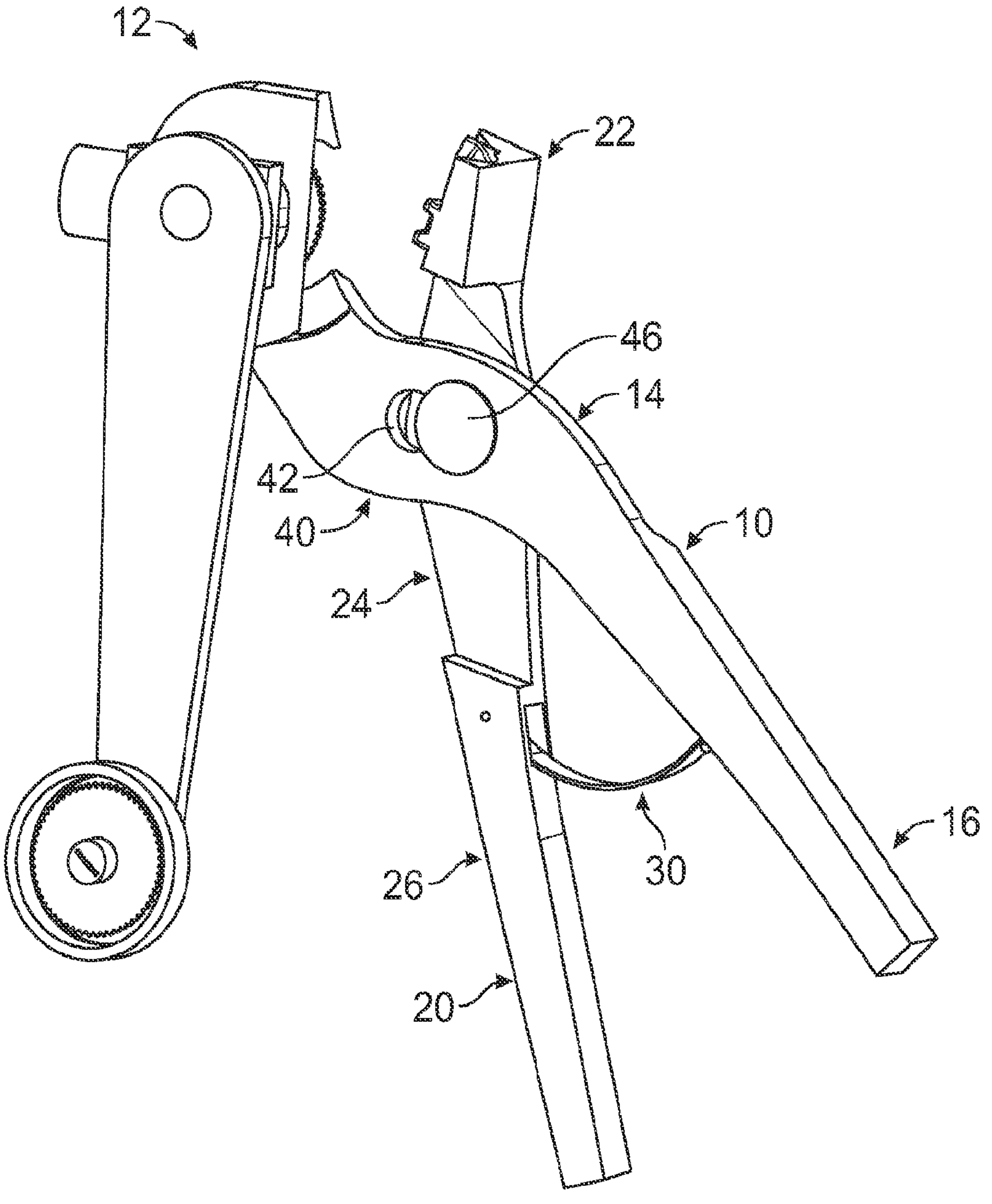
FIG. 6A is a perspective view of a position switching mechanism of the stripping tool according to an embodiment of the present application.

FIG. 6A to FIG. 8D illustrate various embodiments of a coarse position switching mechanism 40 of the stripping tool 1 according to an embodiment of the present application. As shown in FIG. 6A, the stripping tool 1 includes a coarse position switching mechanism 40 for switching a hinged position between the first handle 10 and the second handle 20, so as to change the distance between the cutting portion 12 and the clamping portion 22 of the stripping tool 1 to adapt the stripping tool 1 to cables of different sizes. With reference to FIG. 1, the coarse position switching mechanism 40 includes a position switching hole 42 formed at the pivoting portion 14 of the first handle 10, a position adjusting hole 44 formed at the pivoting portion 24 of the second handle 20, a handle pivoting shaft 45 and a fixing nut 48, so that the first handle 10 and the second handle 20 can be in two or more relative positions, thereby enabling the stripping tool 1 to adapt to cables C of different diameters.

The position switching hole 42 is closer to the cutting portion 12 of the first handle 10, and the position adjusting hole 44 is closer to the clamping portion 22 of the second handle 20, which is beneficial to the lever effect of the stripping tool 1. The handle pivoting shaft 45 passes through the position switching hole 42 and the position adjusting hole 44.

Figure 6B:
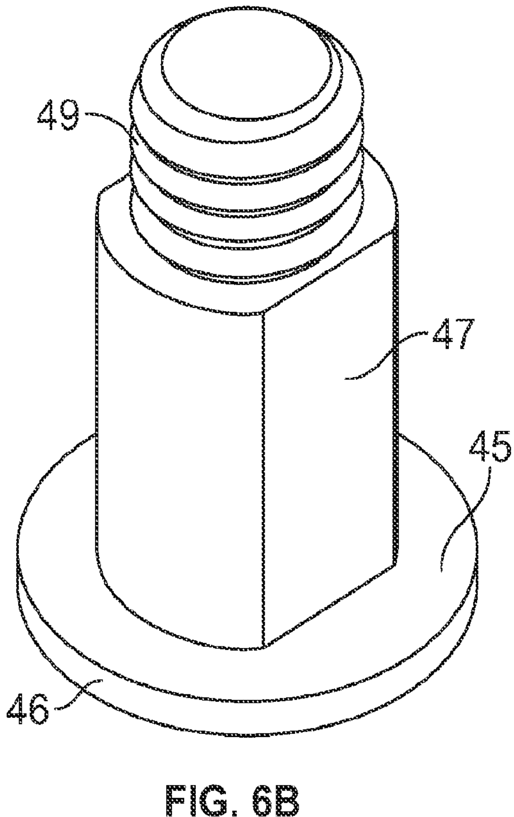
FIG. 6B is a perspective view of a handle pivoting shaft of the position switching mechanism of the stripping tool according to an embodiment of the present application.

As shown in FIGS. 6A and 6B, the handle pivoting shaft 45 includes a headed section 46, a shaft section 47 and a threaded section 49. The headed section 46 is provided at one end of the shaft section 47 of the handle pivoting shaft 45 and abuts against, for example, an outer side of the first handle 10. The threaded section 49 is provided at another end of the shaft section 47 of the handle pivoting shaft 45 and can, for example, at least partially extend out to an outside of the second handle 20. The threaded section 49 of the handle pivoting shaft 45 can cooperate with the fixing nut 48 to fasten the first handle 10 and the second handle 20 together and enable them to pivot relative to each other.

Referring to FIG. 1 again, the position adjusting hole 44 of the second handle 20 is an oblong or oval through hole. The position switching hole 42 of the first handle 10 is a dumbbell shaped or peanut shaped through hole. The shaft section 47 of the handle pivoting shaft 45 has an oblong or oval cross-section, or includes flats as shown in FIG. 6B. In this way, by rotating the handle pivoting shaft 45, the shaft section 47 can be moved within the position switching hole 42 by passing through a narrower portion of the position switching hole 42. After the handle pivoting shaft 45 is moved in place, the movement of the shaft section 47 through the position switching hole 42 can be restricted by rotating the handle pivoting shaft 45.

Those skilled in the art will appreciate that the two handles 10, 20 can be placed in two or more relative positions in various ways.

Figure 7A:
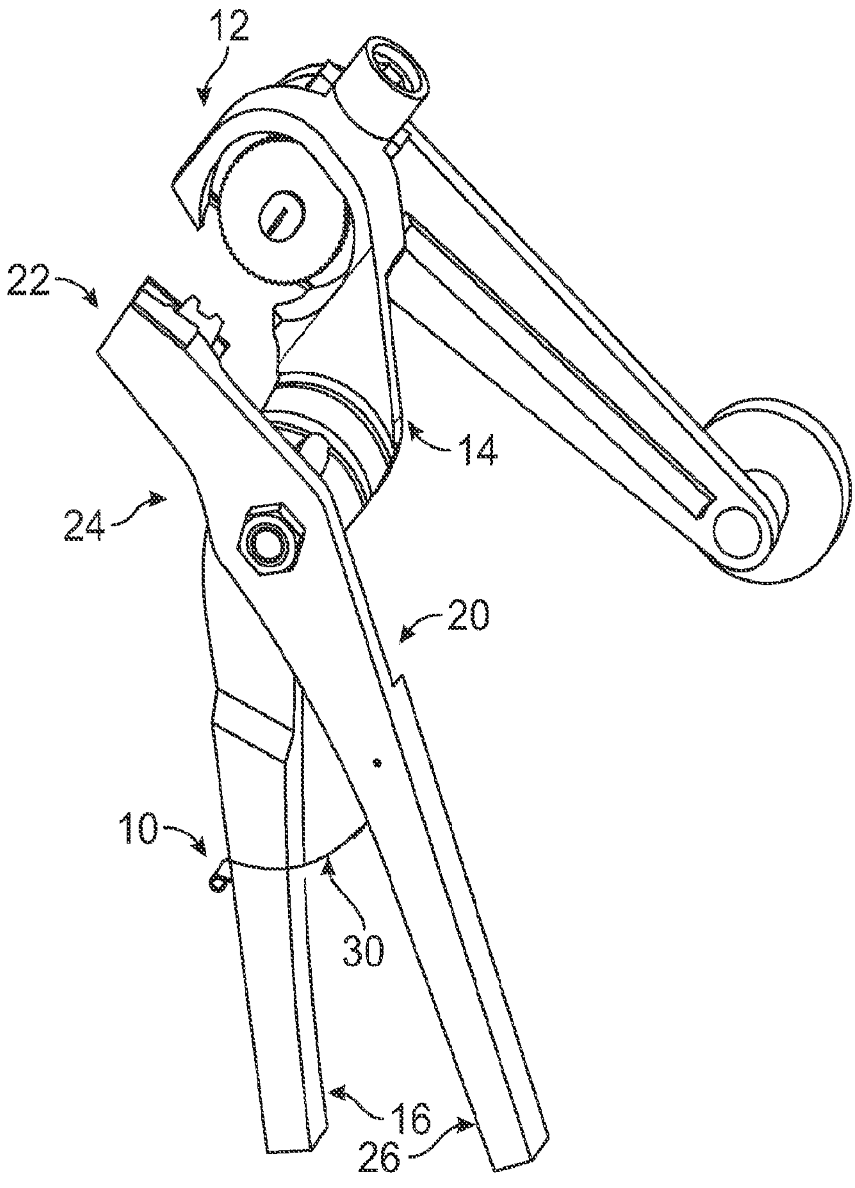
FIG. 7A is a perspective view of the stripping tool according to another alternative embodiment of the present application.
Figure 7B:
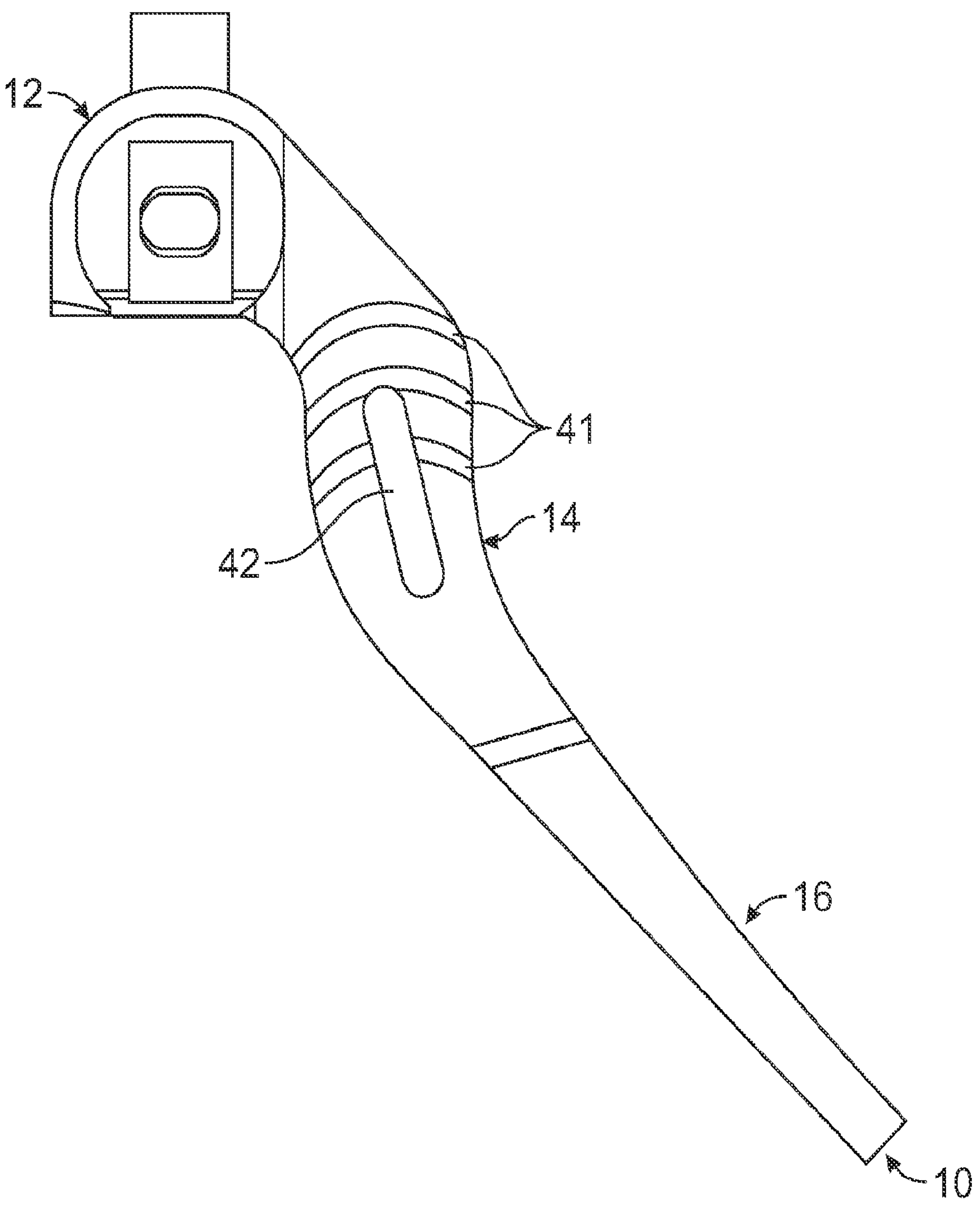
FIG. 7B is a side view of the first handle of the stripping tool according to the another alternative embodiment of the present application.
Figure 7C:
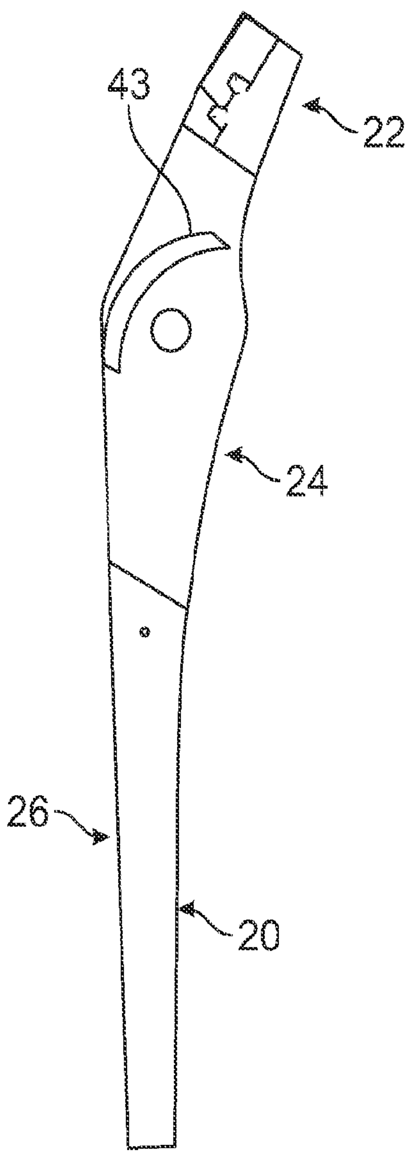
FIG. 7C is a side view of the second handle of the stripping tool according to the another alternative embodiment of the present application.

As an alternative embodiment, as shown in FIGS. 7A-7C, the position switching hole 42 of the first handle 10 is an elongated through hole. In addition, a plurality of arc-shaped position switching grooves 41 are provided on an inner side of the first handle 10. As shown in the figure, three arc-shaped position switching grooves 41 are provided on the inner side of the first handle 10. As shown in FIG. 7C, an arc-shaped position adjusting protrusion 43 is provided on an inner side of the second handle 20. When the relative positions of the first handle 10 and the second handle 20 need to be adjusted, the shaft section 47 of the handle pivoting shaft 45 is moved within the position switching hole 42 of the first handle 10. Then, the position adjusting protrusion 43 of the second handle 20 is inserted into one position switching groove 41 among the multiple position switching grooves 41 of the first handle 10, and the arc-shaped position adjusting protrusion 43 can slide in the corresponding position switching groove 41, so that the second handle 20 can pivot relative to the first handle 10, but cannot translate relative to the first handle 10, unless the first and second handles 10, 20 are opened far enough to be able to adjust the position adjusting protrusion 43 into a different position switching groove 41.

Figure 8A:
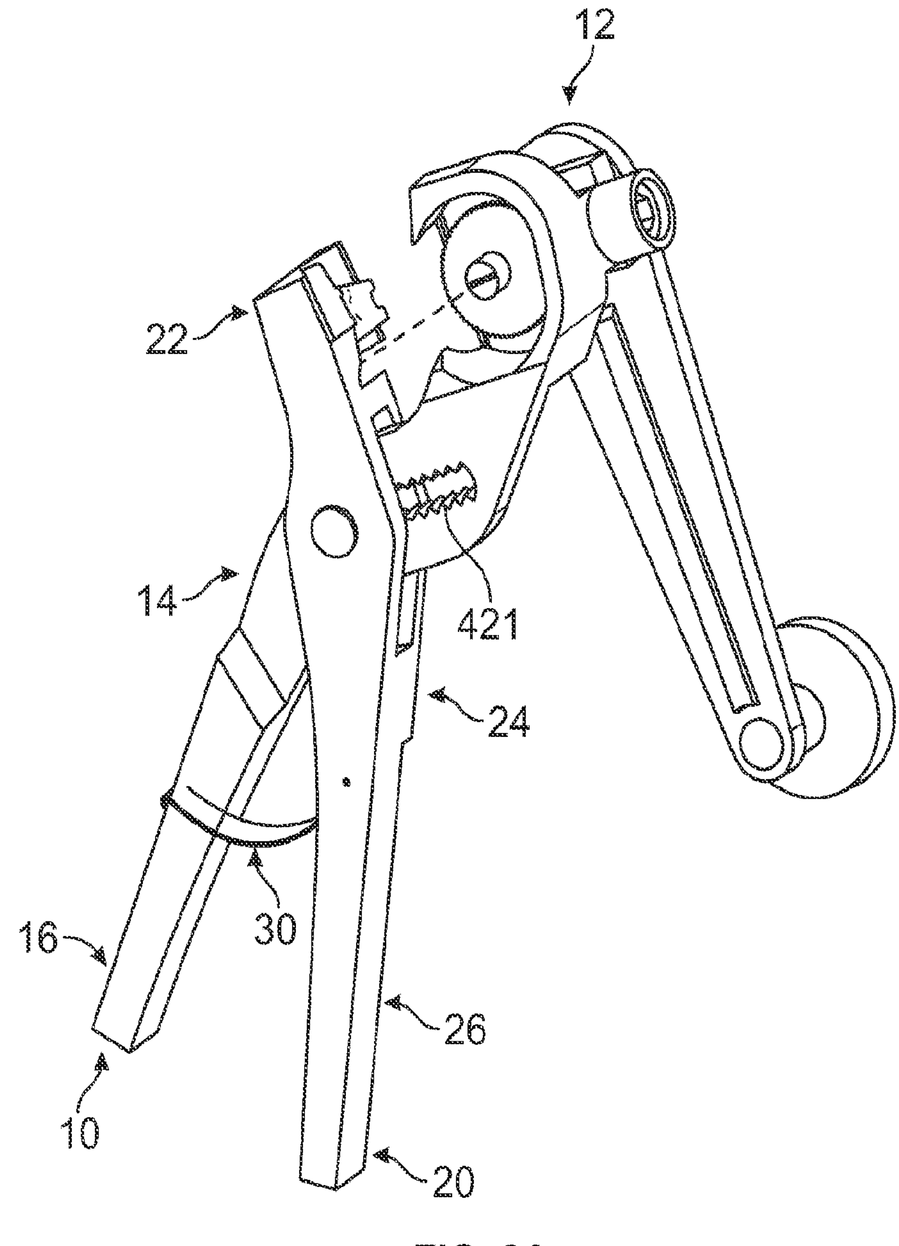
FIG. 8A is a perspective view of the stripping tool according to yet another alternative embodiment of the present application.
Figure 8B:
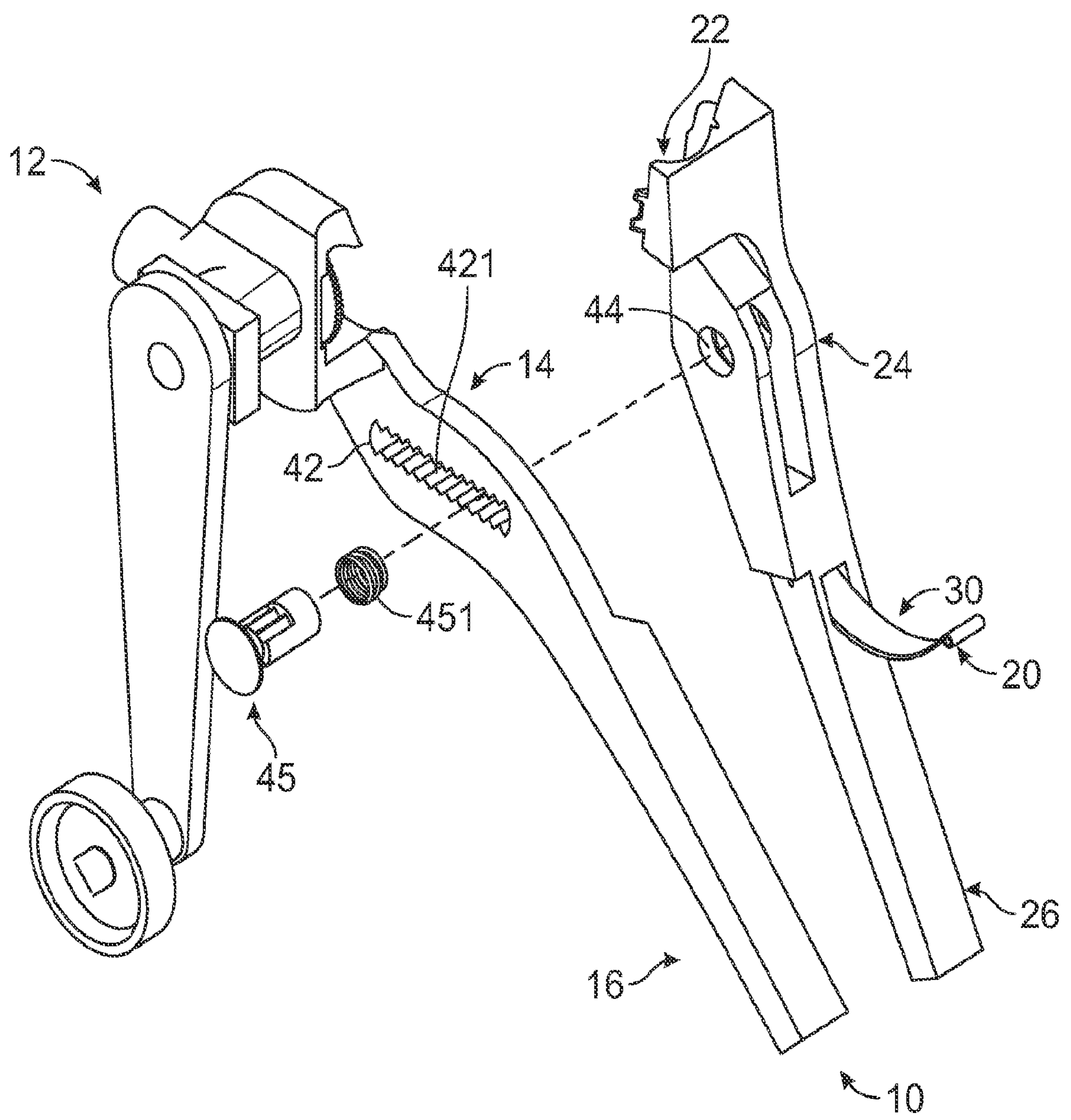
FIG. 8B is a perspective exploded view of the stripping tool according to the yet another alternative embodiment of the present application.
Figure 8C:
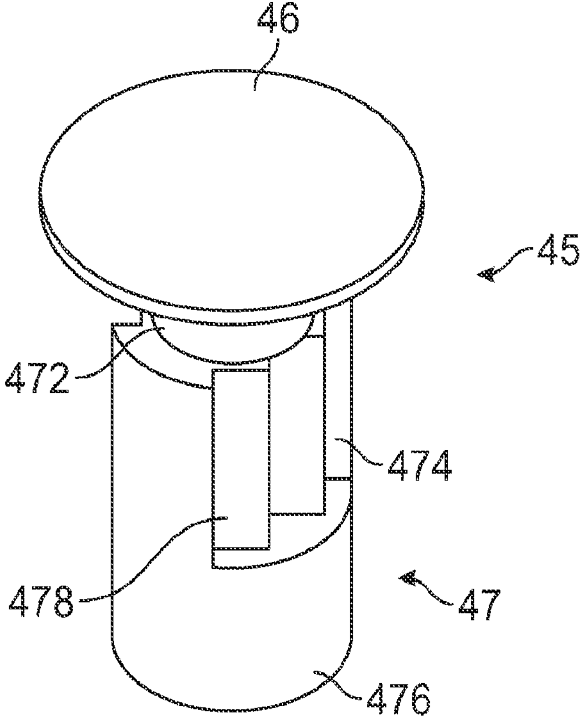
FIG. 8C is a perspective view of the handle pivoting shaft of the stripping tool according to the yet another alternative embodiment of the present application.

As another alternative embodiment, as shown in FIGS. 8A-8D, the pivoting portion 24 of the second handle 20 is hollow. The pivoting portion 14 of the first handle 10 passes through the hollow pivoting portion 24 of the second handle 20. As shown in FIG. 8B, the position switching hole 42 of the first handle 10 is an elongated hole with internal teeth 421. As shown in FIG. 8C, the handle pivoting shaft 45 includes the headed section 46 and the shaft section 47. The shaft section 47 includes in sequence a small-diameter section 472, an outer-tooth section 474 and a large-diameter section 476 along a direction away from the headed section 46. The external teeth part 474 includes multiple external teeth 478 formed on two sides of the handle pivoting shaft 45 relative to the longitudinal axis of the handle pivoting shaft 45. The planes on which the external teeth 478 on two sides are located are parallel to each other. The large-diameter section 476 protrudes beyond the outer-tooth section 474 in the radial direction.

Figure 8D:
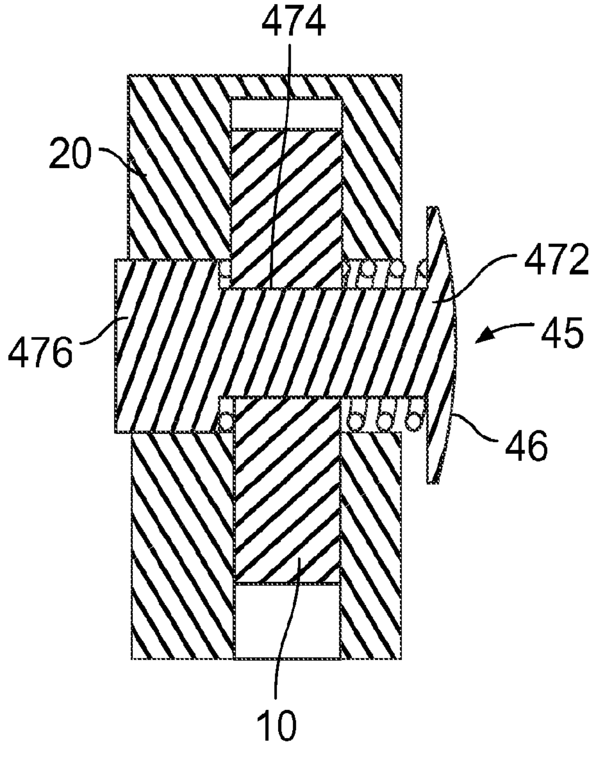
FIG. 8D is a partly sectional view of a pivoting portion of the stripping tool according to the yet another alternative embodiment of the present application.

As shown in FIG. 8D, after assembly, the handle pivoting shaft 45 passes through the position switching hole 42 of the first handle 10 and the position adjusting hole 44 of the second handle 20. A preloaded spring 451 abuts against the headed section 46 of the handle pivoting shaft 45 and also against the first handle 10 to apply tension between the headed section 46 of the handle pivoting shaft 45 and the first handle 10, so that the large-diameter section 476 of the handle pivoting shaft 45 abuts against one side, opposite to the preloaded spring 451, of the first handle 10. In this embodiment, the outer teeth 478 of the outer-tooth section 474 of the handle pivoting shaft 45 can engage with the inner teeth 421 of the position switching hole 42 of the first handle 10, and the large-diameter section 476 of the handle pivoting shaft 45 is accommodated in the position adjusting hole 44 of the second handle 20. In this embodiment, the first handle 10 and the handle pivoting shaft 45 are fixedly connected, and the second handle 20 can pivot around the handle pivoting shaft 45 relative to the first handle 10. When the position of the handle pivoting shaft 45 needs to be adjusted, the user presses the headed section 46 of the handle pivoting shaft 45 along the longitudinal axis of the handle pivoting shaft 45, and the large-diameter section 476 of the handle pivoting shaft 45 slides outward in the position adjusting hole 44 of the second handle 20 to guide the small-diameter section 472 of the handle pivoting shaft 45 to move to the original position of the outer-tooth section 474, so that the outer teeth 478 of the outer-tooth section 474 of the handle pivoting shaft 45 no longer engage with the inner teeth 421 of the position switching hole 42 of the first handle 10. Thus, the second handle 20 and the handle pivoting shaft 45 can be translated relative to the first handle 10 so as to adjust the relative positions of the two. When the two handles 10, 20 have been adjusted to be in place, the user releases the head section 46 of the handle pivoting shaft 45, and under the action of the restoring force of the preloaded spring 451, the large-diameter section 476 of the handle pivoting shaft 45 slides inward in the position adjusting hole 44 of the second handle 20, guiding the outer teeth 478 of the outer-tooth section 474 of the handle pivoting shaft 45 back to the position where the outer teeth mesh with the inner teeth 421 of the position switching hole 42 of the first handle 10, so that the first handle 10 and the second handle 20 are pivotally connected in the new position.

7. Gripping Portion Design

In each embodiment, as shown in FIG. 1, FIG. 6A and FIG. 8A, a spring 30 may be provided between the gripping portion 26 of the second handle 20 of the stripping tool 1 and the gripping portion 16 of the first handle 10, which is configured to bias the handles 10, 20 open after a user's clamping force is released.

In the embodiments shown above, the spring 30 is a leaf spring. However, those skilled in the art will appreciate that the spring 30 can also take other forms, such as a coil spring and the like, as long as it can open the two handles.

In addition, the shape of the gripping portion 16, 26 of each handle 10, 20 is also designed according to mechanical principles to facilitate gripping and force-exerting.

8. Wire Stripping Blade

Figure 9A:
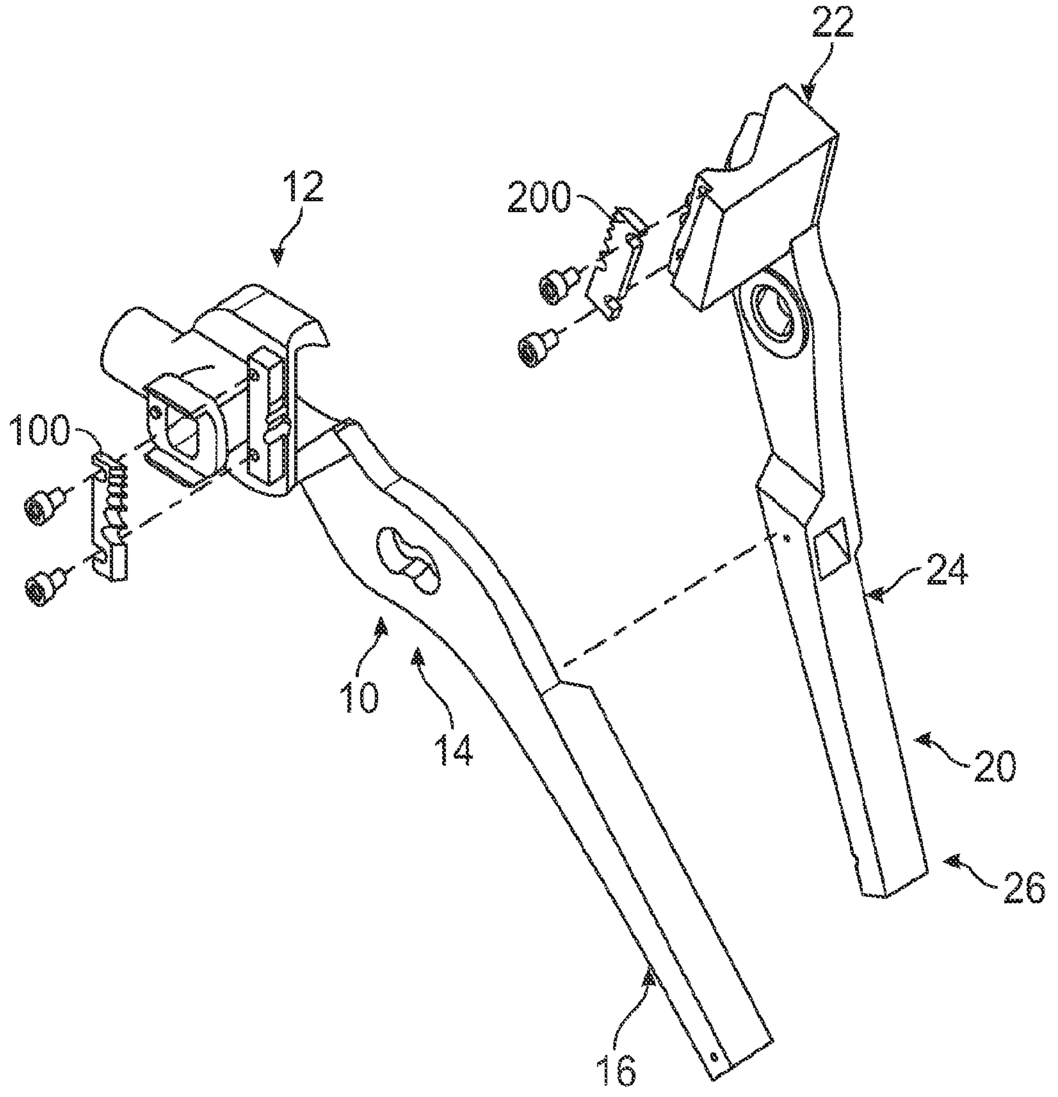
FIG. 9A is a perspective exploded view of the stripping tool with wire stripping blades, according to an embodiment of the present application.
Figure 9B:
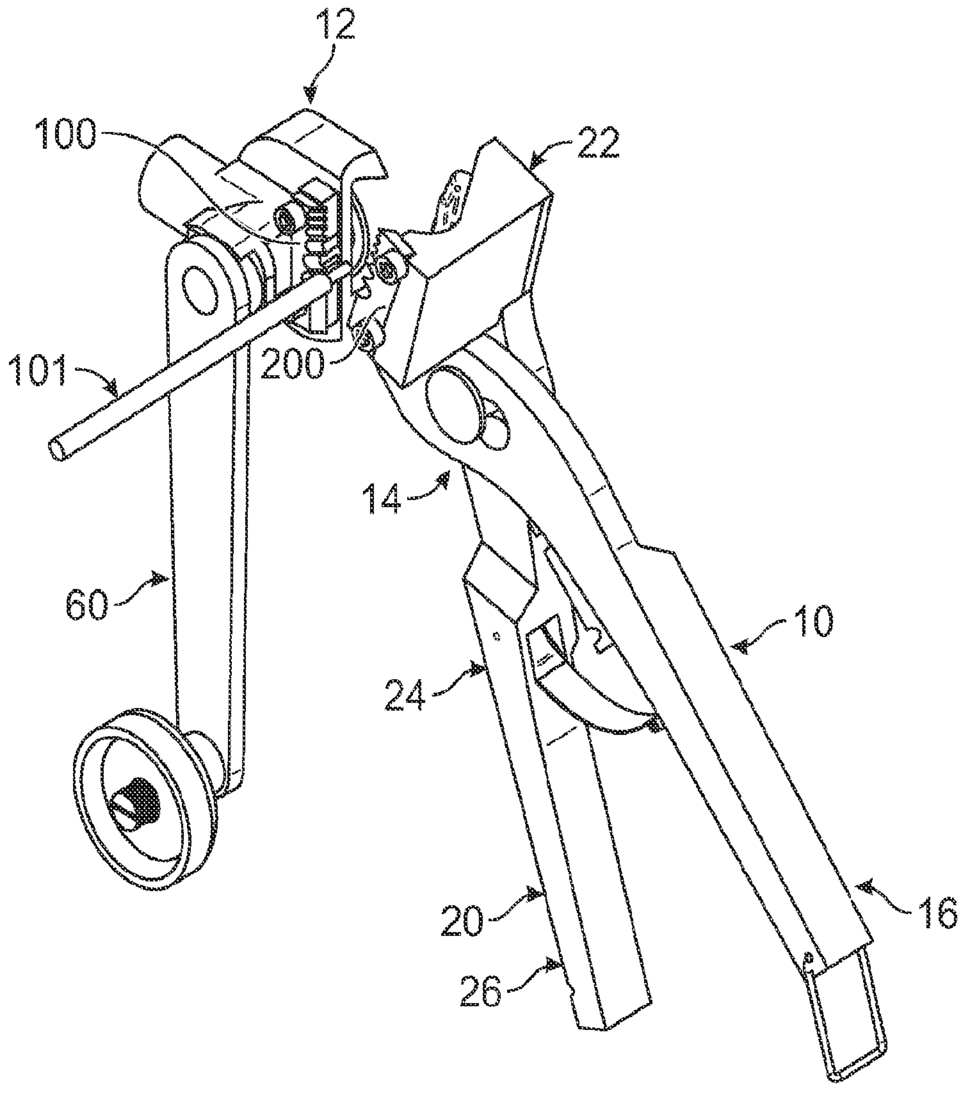
FIG. 9B is a perspective view of the stripping tool with wire stripping blades, which is stripping a cable, according to an embodiment of the present application.

Typically, multiple strands of metal wires with plastic insulation layer are enclosed in the outer protective casing of the armored cable C. In actual operation, after the protective casing has been cut open with the means according to the present application, it is often required to cut off the inner wires 101 and remove the polymeric or non-conductive insulation layer for electrical connection. In the embodiment shown in FIGS. 9A-10B of the present application, a stripping tool for cutting the inner metal wires of the armored cable C and stripping the insulation layer of the inner wires 101 is provided. Referring to FIGS. 9A and 9B, a first wire stripping blade 100 is provided on the cutting portion 12, especially on the side close to the crank 60, and a second wire stripping blade 200 is provided on the clamping portion 22, especially on the side close to the crank 60. When the first handle 10 and the second handle 20 are clapped tight, the first wire stripping blade 100 and the second stripping blade 200 can cooperate with each other to cut and strip the insulation layer off of the inner wires 101.

As shown in FIG. 9B, the inner wires 101 are disposed between the first stripping blade 100 and the second stripping blade 200 in a direction transverse to the armor-wrapped cable C for cutting and/or stripping the inner wires 101.

Figure 9C:
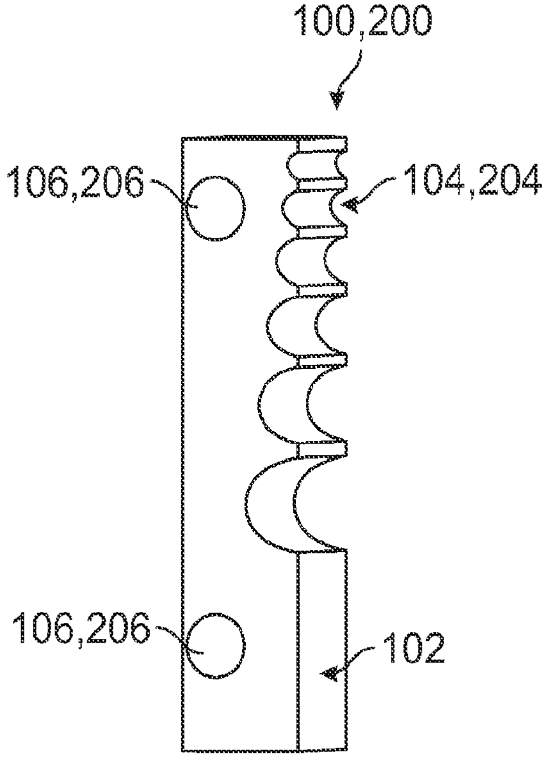
FIG. 9C is a front view of the wire stripping blade of the stripping tool with wire stripping blades, according to an embodiment of the present application.

As shown in FIG. 9C, the first wire stripping blade 100 and the second wire stripping blade 200 are rectangular. Cutting blades 102 and 202 are formed on one side of the first wire stripping blade 100 and the second wire stripping blade 200 to serve as cutting areas, and multiple semicircular cutting edges 104 and 204 gradually expanding from ends of the first wire stripping blade 100 and the second wire stripping blade 200 are provided along the length of the first wire stripping blade 100 and the second wire stripping blade 200 to serve as stripping areas. The sizes of the cutting edges 104 and 204 gradually increase, so that the first wire stripping blade 100 and the second wire stripping blade 200 can adapt to wires of various diameters. Preferably, complete or partially circular holes 106 and 206 are provided on opposite sides of the first wire stripping blade 100 and the second wire stripping blade 200, so as to fix, with fasteners, the first wire stripping blade 100 to the first handle 10 and the second wire stripping blade 200 to the second handle 20. Preferably, two holes 106 and 206 are provided on the first wire stripping blade 100 and the second wire stripping blade 200. Those skilled in the art will appreciate that one or more than two holes may be provided. Those skilled in the art will also appreciate that the first wire stripping blade 100 can be fixed to the first handle 10 and the second wire stripping blade 200 can be fixed to the second handle 20 by other means such as bonding, welding, shape-matching fixing, and so on.

Referring to FIGS. 9A and 9B again, the first wire stripping blade 100 and the second wire stripping blade 200 are such arranged that the cutting blade 102 of the first wire stripping blade 100 and the cutting blade 202 of the second wire stripping blade 200 face each other, and the cutting edges 104 of the first wire stripping blade 100 and the cutting edges 204 of the second wire stripping blade 200 face each other, so that the cutting edges 104 and 204 of the same size are matched.

By arranging the first wire stripping blade 100 and the second wire stripping blade 200, the application of the stripping tool 1 can be increased, and fewer tools need to be carried, facilitating the on-site work.

Figure 10A:
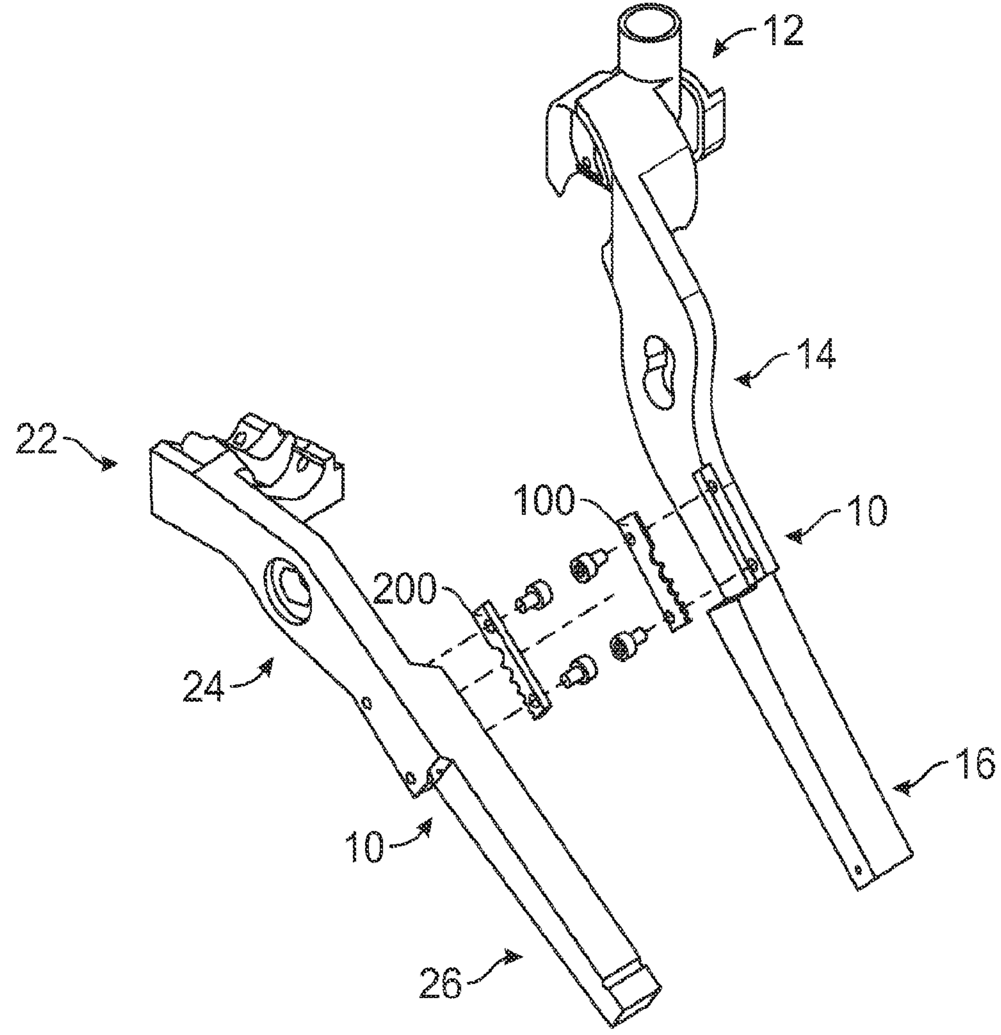
FIG. 10A is a perspective exploded view of the stripping tool with wire stripping blades, according to another embodiment of the present application.

Alternatively or additionally, as shown in FIG. 10A, the first wire stripping blade 100 is arranged on a side away from the cutting portion 12 relative to the pivoting portion 14 of the first handle 10, and the second wire stripping blade 200 is arranged on a side away from the clamping portion 22 relative to the pivoting portion 24 of the second handle 20. The first wire stripping blade 100 and the second wire stripping blade 200 are such arranged that the cutting blade 102 of the first wire stripping blade 100 and the cutting blade 202 of the second wire stripping blade 200 face each other, and the cutting edges 104 of the first wire stripping blade 100 and the cutting edges 204 of the second wire stripping blade 200 face each other, so that the cutting edges 104 and 204 of the same size are matched.

Figure 10B:
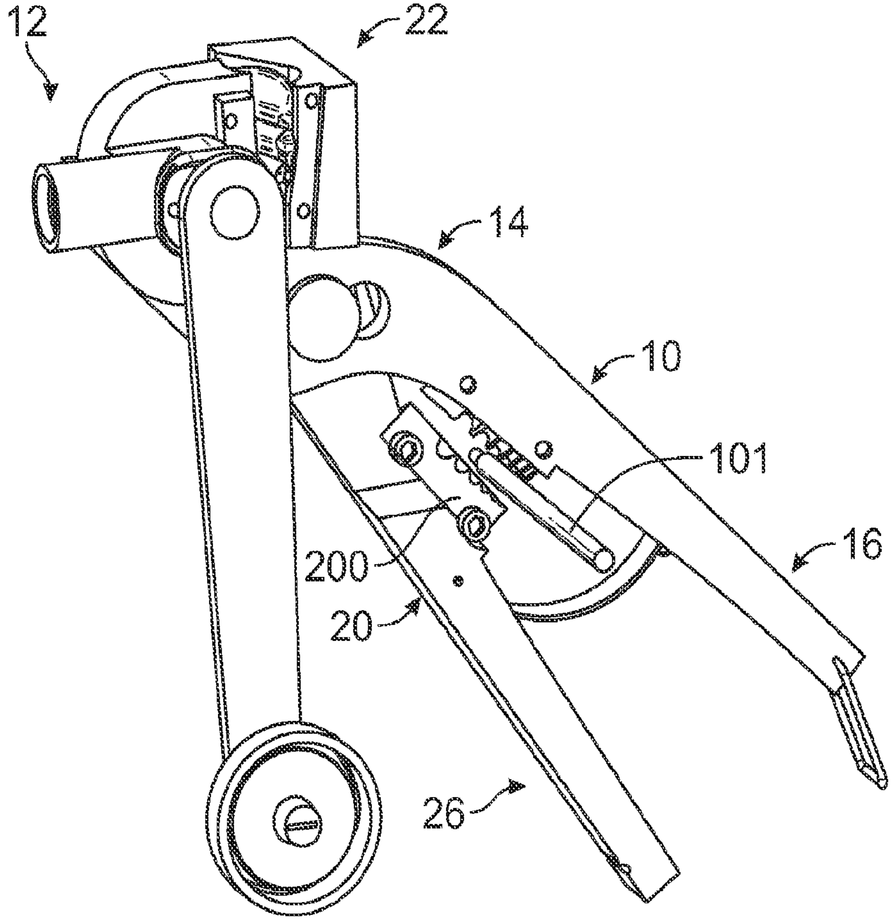
FIG. 10B is a perspective view of the stripping tool with wire stripping blades, which is stripping a cable, according to the another embodiment of the present application.
Figure 11:
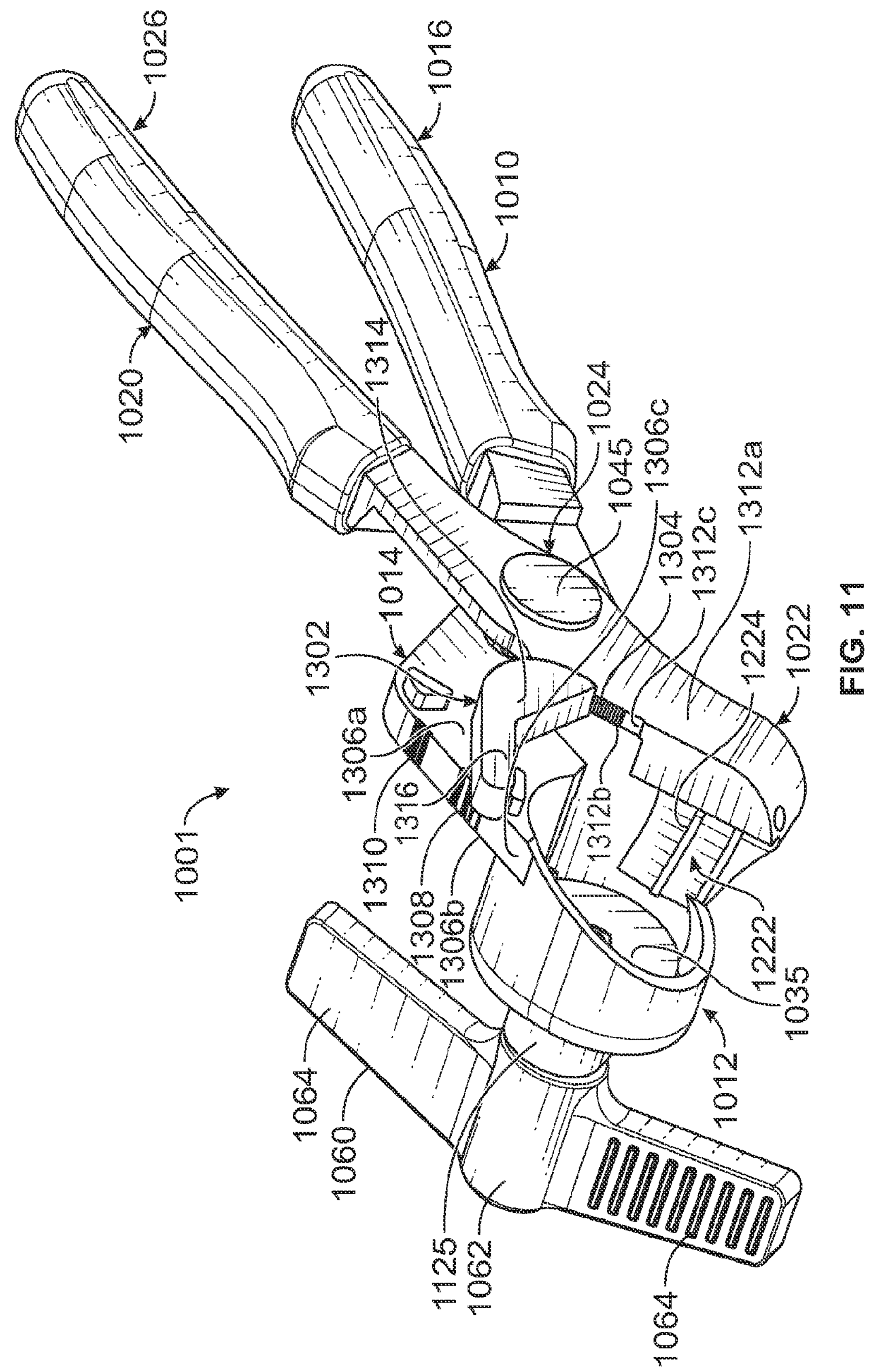
FIG. 11 is a perspective exploded view of a stripping tool according to another embodiment of the present application which includes a fine position adjustment mechanism.
Figure 12:
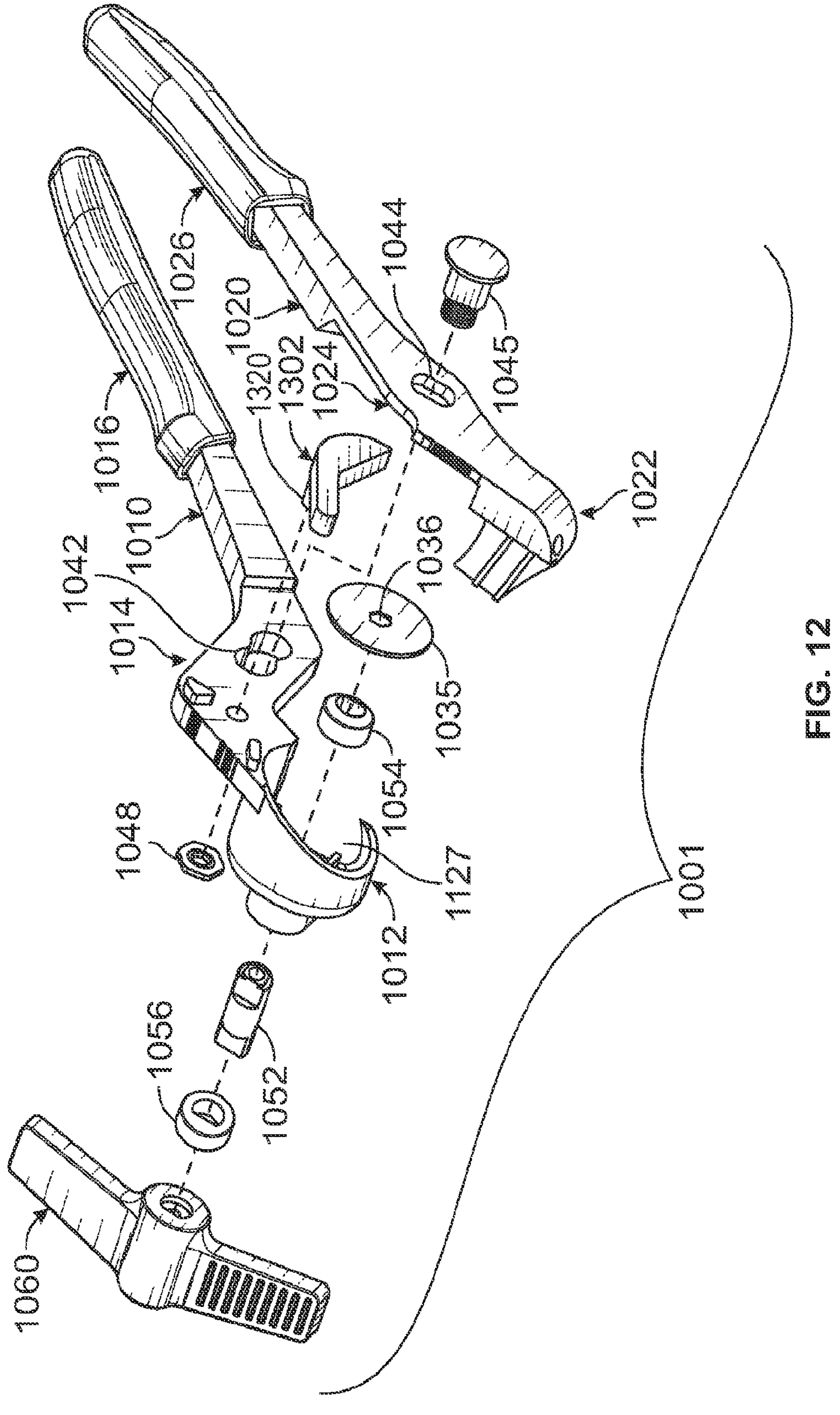
FIG. 12 is an exploded perspective exploded view of the stripping tool of FIG. 11.
Figure 13:
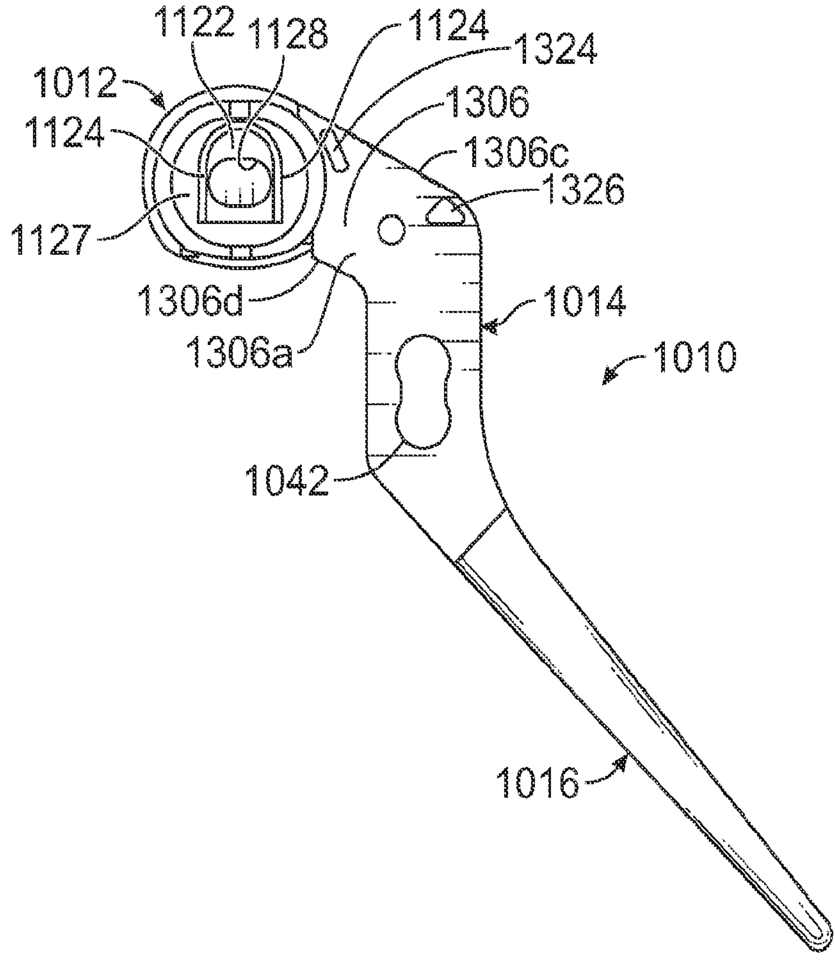
FIG. 13 is side elevation view of a first handle of the stripping tool of FIG. 11.
Figure 14:
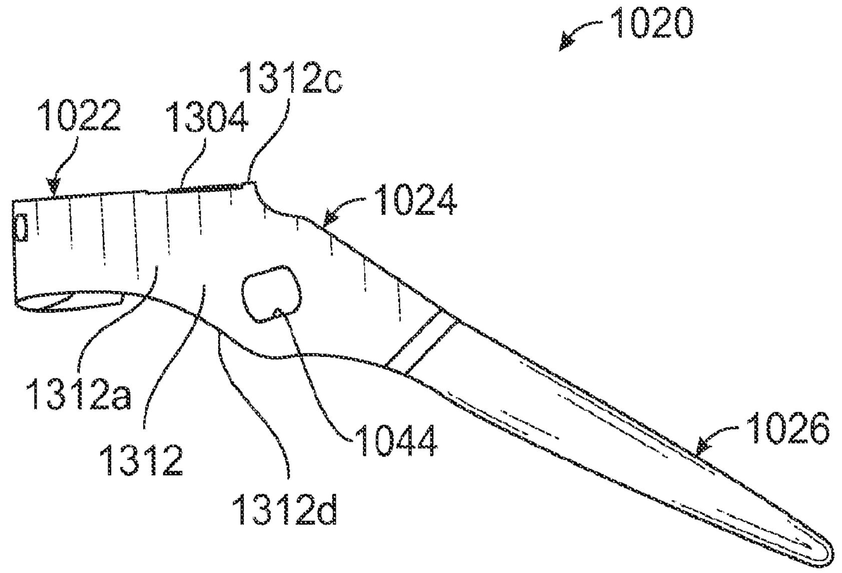
FIG. 14 is side elevation view of a second handle of the stripping tool of FIG. 11.
Figure 15:
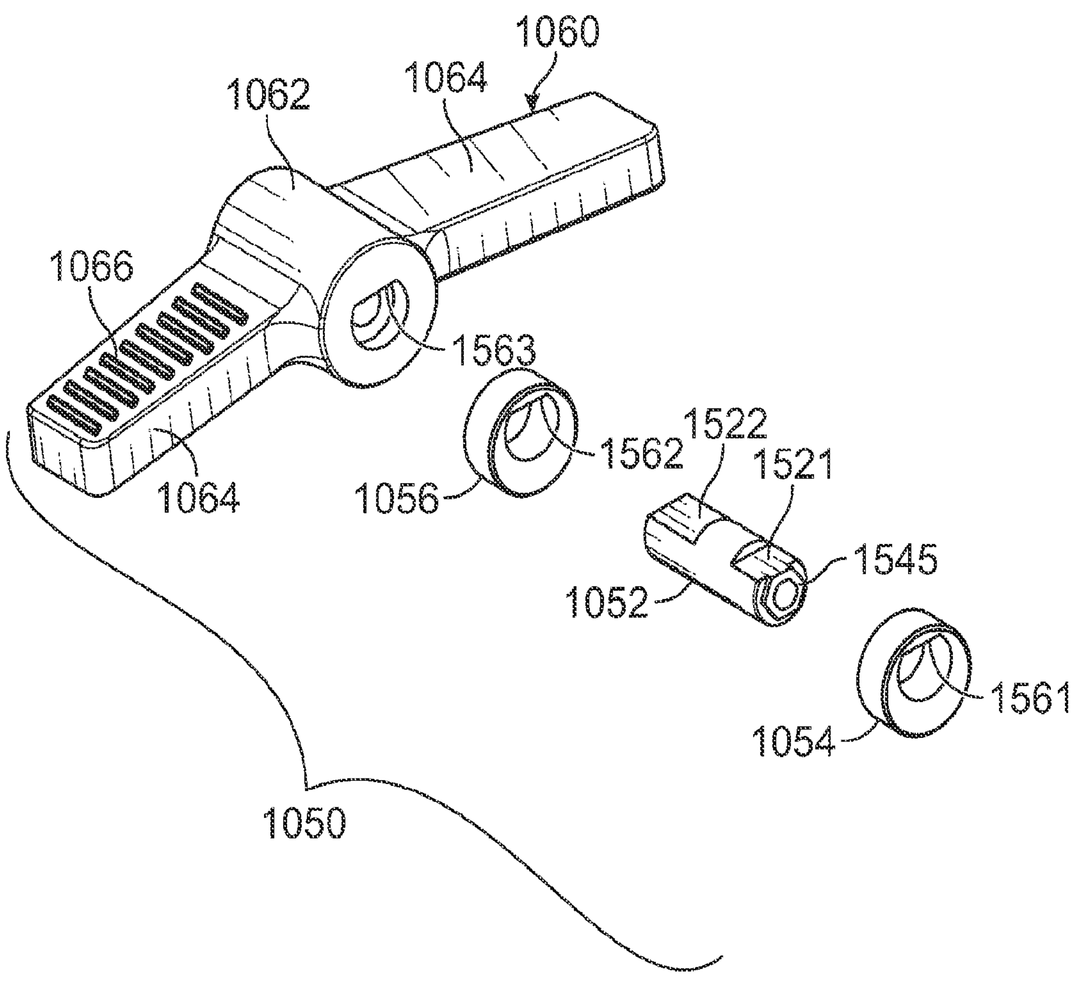
FIG. 15 is an exploded perspective view of a drive mechanism of the stripping tool of FIG. 11.
Figure 16:
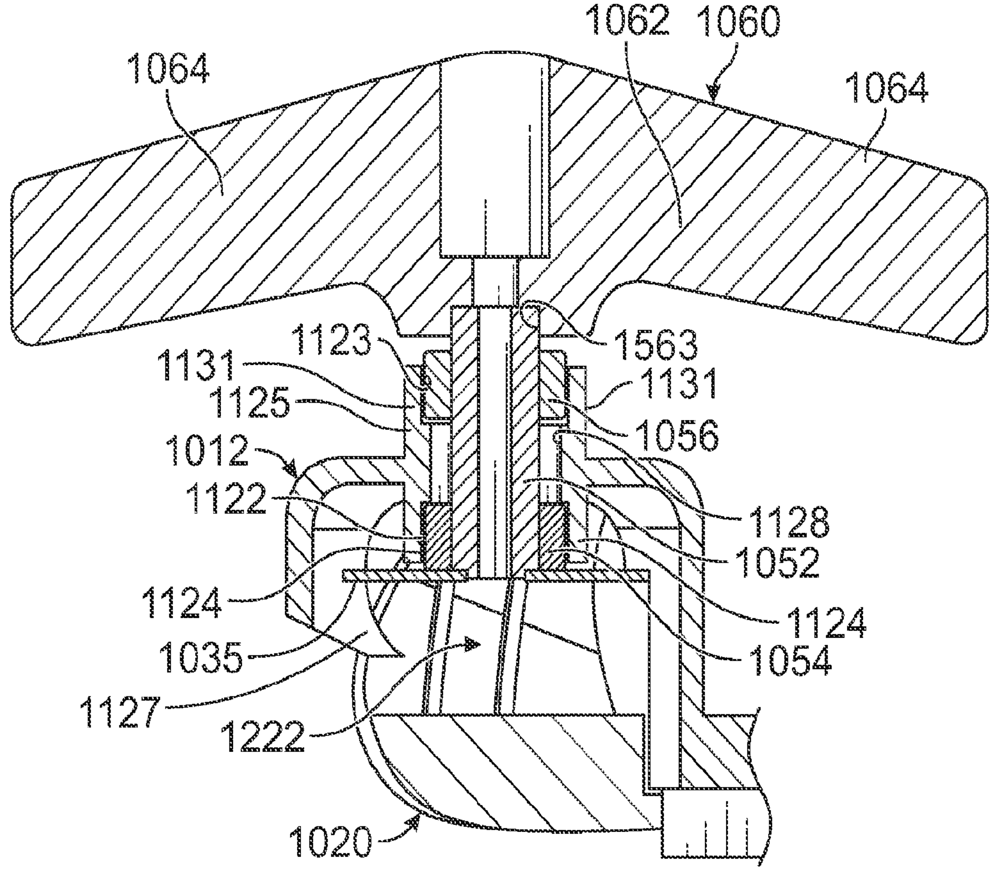
FIG. 16 is a cross-sectional view through the drive mechanism of the stripping tool of FIG. 11.

As shown in FIG. 10B, the inner wire 101 is disposed between the first stripping blade 100 and the second stripping blade 200 in a direction transverse to the first handle 10 and the second handle 20 for cutting and/or stripping. Since the first stripping blade 100 is disposed near the pivoting portion 14 of the first handle 10, and the second stripping blade 200 is disposed near the pivoting portion 24 of the second handle 20, so that the force used when cutting the cable and stripping the insulation layer of the cable can be reduced.

The stripping tool 1 provides for a coarse adjustment of the positioning of the handle pivoting shaft 45 with the position switching hole 42. FIGS. 11-23 show a stripping tool 1001 for an armor-wrapped cable according to other embodiments of the present application which includes the coarse adjustment, and further provides for a fine adjustment of the final position of the first and second handles so as to provide further adjustability. The stripping tool 1001 includes a first handle 1010 and a second handle 1020. The first handle 1010 includes a cutting portion 1012, a pivoting portion 1014 and a gripping portion 1016. The second handle 1020 includes a clamping portion 1022, a pivoting portion 1024 and a gripping portion 1026. The first handle 1010 and the second handle 1020 are pivotally connected at the pivoting portion 1014 of the first handle 1010 and the pivoting portion 1024 of the second handle 1020, so that the whole stripping tool 1001 has an "X" shape. In other words, the pivoting portion 1014 of the first handle 1010 is located between the gripping portion 1016 and the cutting portion 1012, and the pivoting portion 1024 of the second handle 1020 is located between the gripping portion 1026 and the clamping portion 1022. During use, a user holds the gripping portion 1016 of the first handle 1010 and the gripping portion 1026 of the second handle 1020, and pivots the second handle 1020 relative to the first handle 1010, so as to clamp the armor-wrapped cable between the cutting portion 1012 of the first handle 1010 and the clamping portion 1022 of the second handle 1020, and cut a protective casing of the armor-wrapped cable by the cutting portion 1012 of the first handle 1010. With this arrangement of the first handle 1010 and the second handle 1020, the user can use the lever principle to cut the cable not only with the power of the wrist and fingers, but also with the power of the arm, achieving a labor-saving technical effect. The stripping tool 1001 can facilitate operation and improve the efficiency of cutting the armor-wrapped cable.

The cable to be cut is held between the cutting portion 1012 of the first handle 1010 and the clamping portion 1022 of the second handle 1020, so as to hold and cut the cable. After the cable is held between the cutting portion 1012 and the clamping portion 1022, a disc-shaped cutting blade 1035 accommodated in the cutting portion 1012 of the first handle 1010 is driven by a drive mechanism 1050, so that the cutting blade 1035 is driven to rotate and translate back and forth along an extending direction of the cable as described later, thereby cutting the armored metal portion of the cable. The cutting blade 1035 is accommodated in the cutting portion 1012 of the first handle 1010.

A "V"-shaped opening 1222 opposing the cutting portion 1012 of the first handle 1010 is formed in the clamping portion 1022 of the second handle 1020 of the stripping tool 1001. When the cable is clamped in the stripping tool 1001, the cable can be placed in the "V"-shaped opening 1222 of the clamping portion 1022. As the outer diameter of the cable varies, the cable is placed at different depths in the "V"-shaped opening 1222 of the clamping portion 1022, thereby making the stripping tool 1001 especially suitable for large armor-wrapped cables. Furthermore, the opening 1222 can ensure that the stripping tool 1001 holds the cable stably so that the cutting blade is aligned with the center axis of the cable. Preferably, one or more ribs 1224 matching the profile of the cable and arranged side by side are further on a clamping surface of the V-shaped opening 1222 of the clamping portion 1022 of the second handle 1020 of the stripping tool 1001. Each rib 1224 protrudes into a corresponding recessed portion of the corrugated outer surface of the cable, thereby helping to hold the cable in place and preventing movement of the cable along the longitudinal axis of the cable.

A. Drive Mechanism of a Dual-Cam

The drive mechanism 1050 is provided on the cutting portion 1012 of the first handle 1010. The drive mechanism 1050 includes a driveshaft 1052, a first cam 1054, a second cam 1056 and a crank 1060. The first cam 1054 and the second cam 1056 are respectively located on two sides of the first handle 1010. The driveshaft 1052 passes through an elongated mounting hole 1128 located in the cutting portion 1012. The size of the elongated mounting hole 1128 is larger than the diameter of the driveshaft 1052, so that the driveshaft 1052 can translate in the elongated mounting hole 1128 and moves linearly along the axis of the cable. One end of the driveshaft 1052 is integrated or fixedly connected with the first cam 1054 and the crank 1060, and the other end of the driveshaft 1052 is integrated or fixedly connected with the second cam 1056. The first cam 1054 and the second cam 1056 have the same profile, and the first cam 1054 and the second cam 1056 are such arranged so that they rotate in the same phase together.

A flat part 1521 is formed at one end of the driveshaft 1052, and a flat hole 1561 is formed in the first cam 1054 that is fitted therewith. A flat part 1522 is formed at the other end of the driveshaft 1052, and flat holes 1562, 1563 are respectively formed in the second cam 1056 and the crank 1060 that are fitted therewith. This enables the first cam 1054 and the second cam 1056 to rotate together in the same phase when the crank 1060 is rotated. The first cam 1054 and the second cam 1056 are embodied as eccentric wheels, that is, the wheel body itself is circular, but the driveshaft 1052 is eccentrically installed with reference to the wheel body.

The cutting blade 1035 may be connected to the first cam 1054 in various ways as described hereinabove. In the embodiment as shown, a polygonal mounting protrusion 1545 protruding along the rotational axis is provided on an end of the driveshaft 1052, and the mounting protrusion 1545 cooperates with a mounting hole 1036 having a matching shape in the center of the cutting blade 1035 to realize the connection.

A recessed portion 1127 which is open at a lower side is formed on a first side of the cutting portion 1012 of the first handle 1010 at a first end thereof, the recessed portion 1127 is configured to accommodate the driveshaft 1052, the first cam 1054 and the cutting blade 1035 connected with the first cam 1054, so that the edge of the cutting blade 1035 after installation is exposed only at a cutting position below, and is enclosed by side walls of the recessed portion 1127 in the remaining directions. A first cam groove 1122 corresponding to the first cam 1054 is formed on an inner wall of the recessed portion 1127. Correspondingly, as shown in the cross-sectional view of FIG. 16, an extension part 1125 extends from a second side of the cutting portion 1012 and a second cam groove 1123 corresponding to the second cam 1056 is formed in the extension part 1125. The first cam groove 1122 and the second cam groove 1123 are generally rectangular grooves with the same shape. The profile of the first cam 1054 and the profile of the second cam 1056 are such designed that during rotation, the first cam 1054 respectively abuts against a pair of opposite side walls 1124 at opposite ends of the elongated mounting hole 1128, similarly, during rotation, the second cam 1056 respectively abuts against a pair of opposite side walls 1131 at opposite ends of the elongated mounting hole 1128. Therefore, when the first cam 1054 and the second cam 1056 rotate together in the same phase under rotation of the crank 1060, the first cam 1054 and the second cam 1056 rotate between the side walls 1124, 1131 of the rectangular cam grooves 1122, 1123, so that the driveshaft 1052 reciprocatingly translates in the extension direction of the cable, and the cutting blade 1035 reciprocates, while rotating, along the extension direction of the cable to cut the armored metal portion of the cable. The reciprocating movement increases the cutting range, making the cut more efficient and allows for a longer length of cut without increasing the depth of cut. The dual-cam design enables the first cam 1054 and the second cam 1056 to be driven by the walls 1124 of the first cam groove 1122 and the walls 1131 of the second cam groove 1123 respectively, so that the force on the driveshaft 1052 is relatively uniform and balanced.

B. Crank

The stripping tool 1 of the embodiments shown in FIGS. 1-10 has an elongated crank 50 that may be five to six inches in length. The crank 50 rotates around the cutting blade 1035 in a circle, which may be a twelve inch circle. This can be difficult for the user to start the cut depending upon where the end of the crank 50 is positioned. Due to a large moment to start the rotation of the crank 50, a countering reaction is needed by a user's clamping hand.

The embodiments of the stripping tool 1001 shown in FIGS. 11-23 provide an improved crank 1060 from that provided in the embodiments of the stripping tool 1 shown in FIGS. 1-10. The crank 1060 includes a central hub 1062 in which the flat hole 1563 is centrally positioned at the middle of the crank 1060, and opposite wings 1064 extending outward from the hub 1062. Each wing 1064 may have a length that is shorter than the crank 50 of the embodiments of the stripping tool 1 shown in FIGS. 1-10, and each may be approximately two to three inches long. In use, the user grasps the wings 1064 with their thumb and index finger to rotate the crank 1060 around the central hub 1062, thereby rotating the second cam 1056, the driveshaft 1052, the first cam 1054 and the cutting blade 1035. The wings 1064 may have a plurality of gripping ribs 1066 provided thereon to provide for enhanced gripping by the user. The gripping ribs 1066 also provide indication of the direction of force to be applied to the wings 1064 in order to achieve a preferred rotation direction of the cutting blade 1035. The large moment that was required to operate the crank 60 of the embodiment of FIG. 1 is significantly reduced, thereby making the drive mechanism 1050 easier to operate since the force applied by the user is split between the two wings 1064 around the same axis of rotation. The crank 1060 eliminates the difficulty in starting the cut since better leverage is provided with the two wings 1064, and provides for a smoother motion during rotation of the crank 1060. This results in a quicker cut. In addition, the user had to rotate the crank 50 of the embodiments of the stripping tool 1 shown in FIGS. 1-10 approximately eight times to achieve the cut, whereas the user has to rotate the crank 1060 approximately one and half times. A smaller package can also be provided with the crank 1060 since the longer length that was required with crank 50 can be eliminated. Furthermore, a more controlled cut is achieved with crank 1060.

C. Coarse Position Switching Mechanism and Fine Position Adjustment Mechanism A coarse position switching mechanism 1040 is provided and is identically formed and operated to that of the stripping tool 1 and specifics are not repeated herein. Like reference numbers are provided for like components, with the components of this embodiment being shown in the one thousands. As discussed herein, the switching mechanism 1040 is used to switch the hinged position between the first handle 1010 and the second handle 1020, so as to change the distance between the cutting portion 1012 and the clamping portion 1022 of the stripping tool 1001 to adapt the stripping tool 1001 to cables of different sizes. This provides for a coarse adjustment of the positions.

Figure 22:
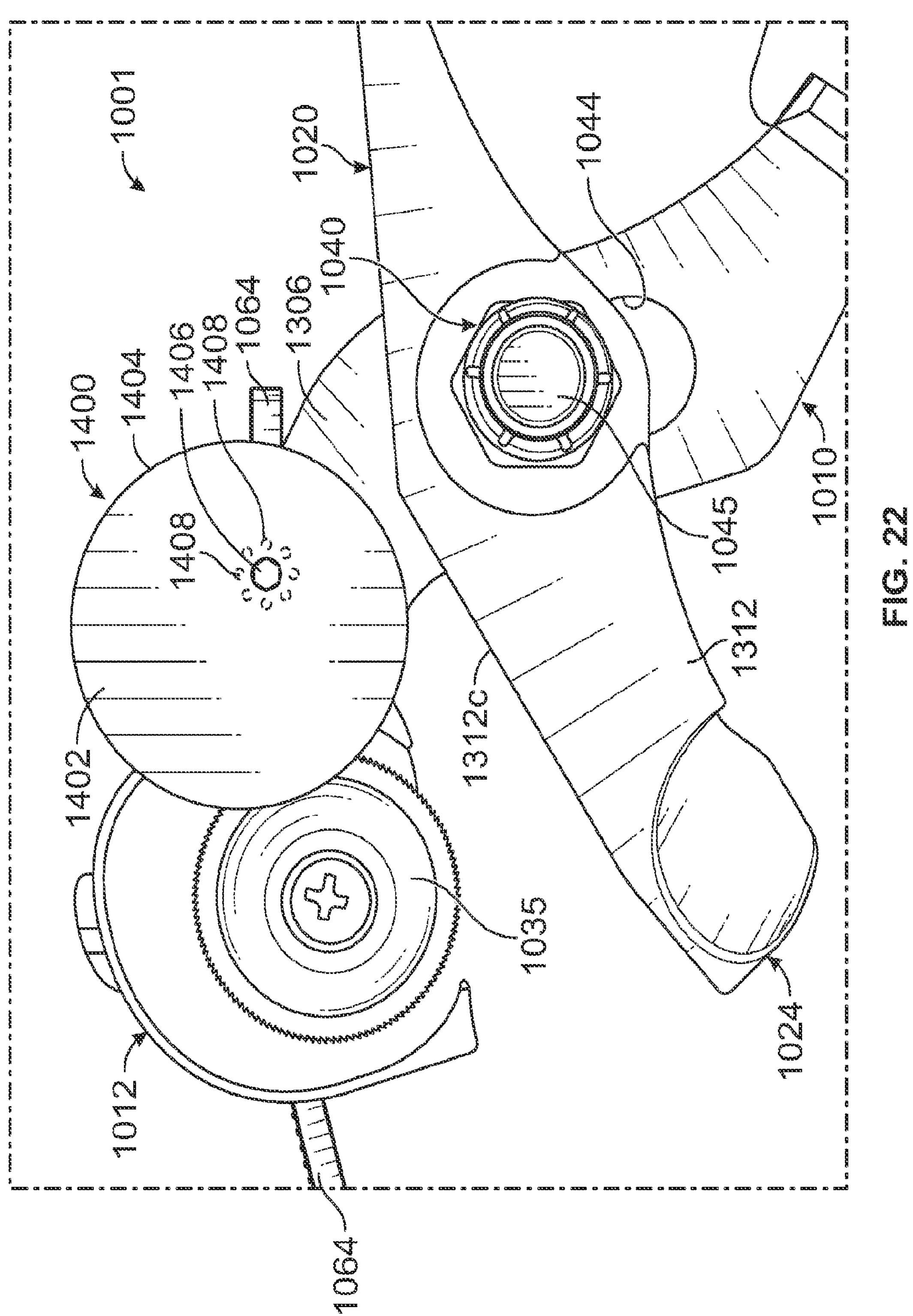
FIG. 22 is a side elevation views of the stripping tool of FIG. 11 but with an alternate fine position adjustment mechanism and shown in a clamping position.
Figure 23:
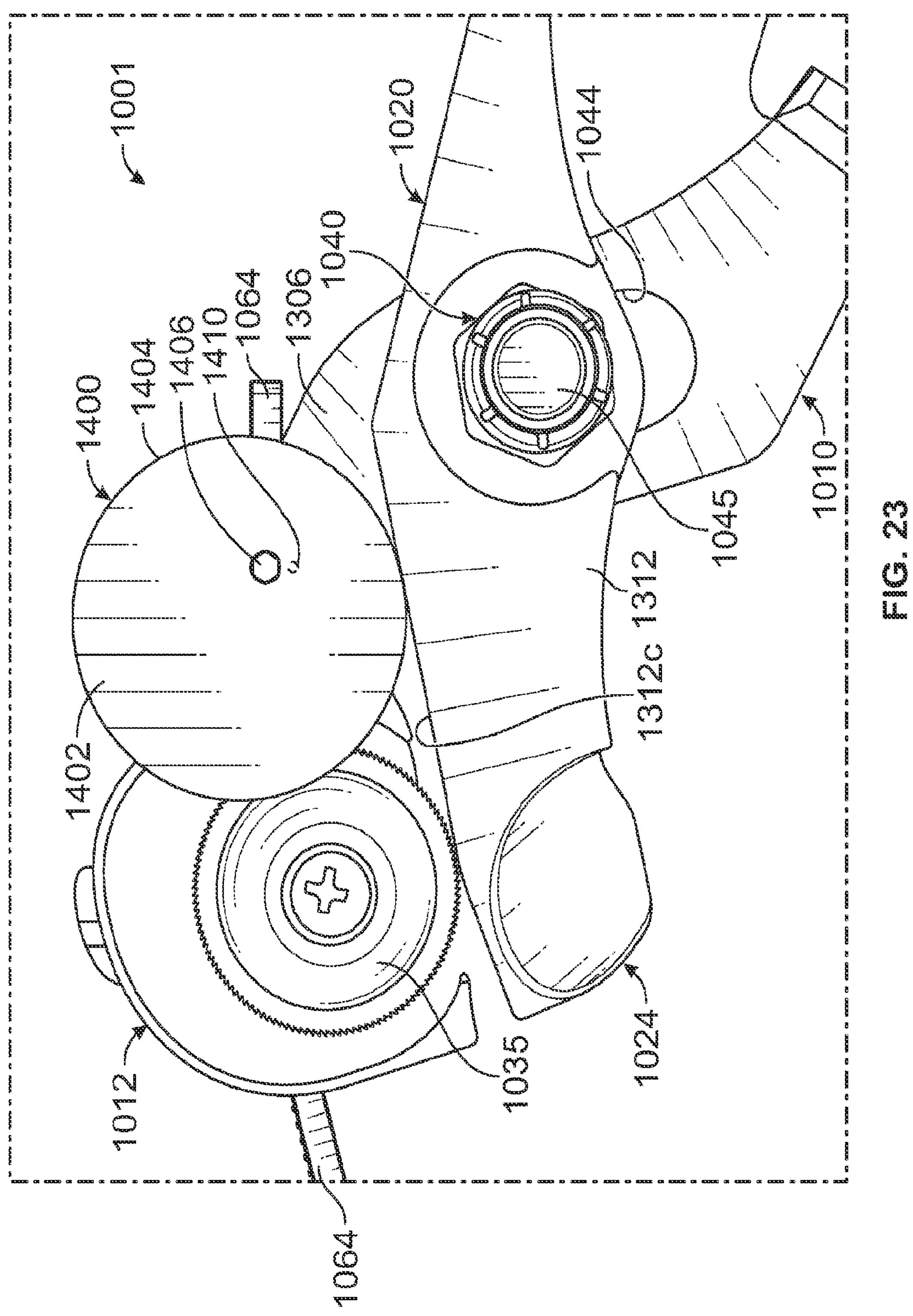
FIG. 23 is a side elevation views of the stripping tool of FIG. 22 shown in a second clamping position.

The stripping tool 1001 of FIGS. 11-23 further provides a fine position adjustment mechanism 1300, 1400. FIGS. 11, 12 and 17-21 show a first embodiment of the fine position adjustment mechanism 1300, and FIGS. 22 and 23 show a second embodiment of the fine position adjustment mechanism 1400.

Attention is invited to the first embodiment of the fine position adjustment mechanism 1300 shown in FIGS. 11, 12 and 17-21. The fine position adjustment mechanism 1300 includes a body 1302 rotatably mounted on the cutting portion 1012 of the first handle 1010 which interacts with teeth 1304 provided on the cutting portion 1022 of the second handle 1020.

The cutting portion 1012 of the first handle 1010 includes the recessed portion 1127 and walls 1124, 1131 at the first end thereof. The cutting portion 1012 further has an extension section 1306 which extends between the recessed portion 1127 and the pivoting portion 1014. A centerline of the extension section 1306 is angled relative to a centerline of the pivoting portion 1014, and may be angled at an angle of 45 degrees, although other angles may be utilized. The extension section 1306 has opposite inner and outer sides 1306*a*, 1306*b*, which extend between a top surface 1306*c* and an opposite bottom surface 1306*d*. The inner side 1306*a* is planar. The top surface 1306*c* has a first set of indicia 1308 which may be formed as a plurality of lines that extend between the sides 1306*a*, 1306*b*, and a second set of indicia 1310 which may be formed as a plurality of lines that extend between the sides 1306*a*, 1306*b*. Alternatively, the first set of indicia 1308 and second set of indicia 1310 may extend partially between sides 1306*a*, 1306*b*. The first set of indicia 1308 is spaced from the second set of indicia 1310.

The clamping portion 1022 of the second handle 1020 includes the "V"-shaped opening 1222 at the first end thereof. The clamping portion 1022 further has an extension section 1312 which extends between the "V"-shaped opening 1222 and the pivoting portion 1034. A centerline of the extension section 1312 is angled relative to a centerline of the pivoting portion 1014, and may be angled at an angle of 30 degrees. The extension section 1312 has opposite inner and outer sides 1312*a*, 1312*b*, which extend between a top surface 1312*c* and an opposite bottom surface 1312*d*. The inner side 1312*a* is planar and faces the inner side 1306*a* of the cutting portion 1012 of the first handle 1010. The teeth 1304 are on the top surface 1312*c*.

Figure 18:
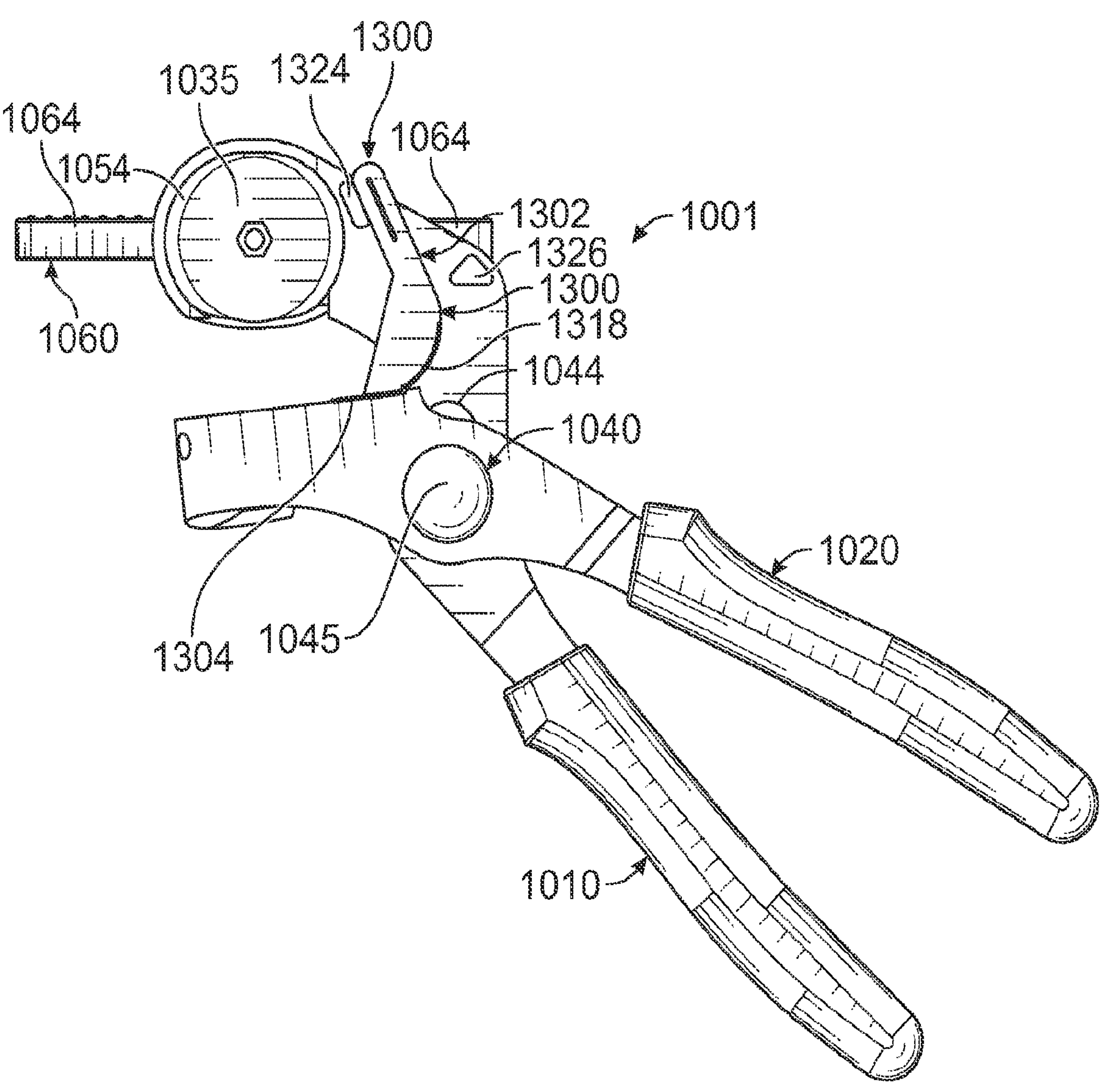
FIGS. 18-21 are side elevation views of the stripping tool of FIG. 11 showing the stripping tool of FIG. 11 in different clamping positions.
Figure 20:
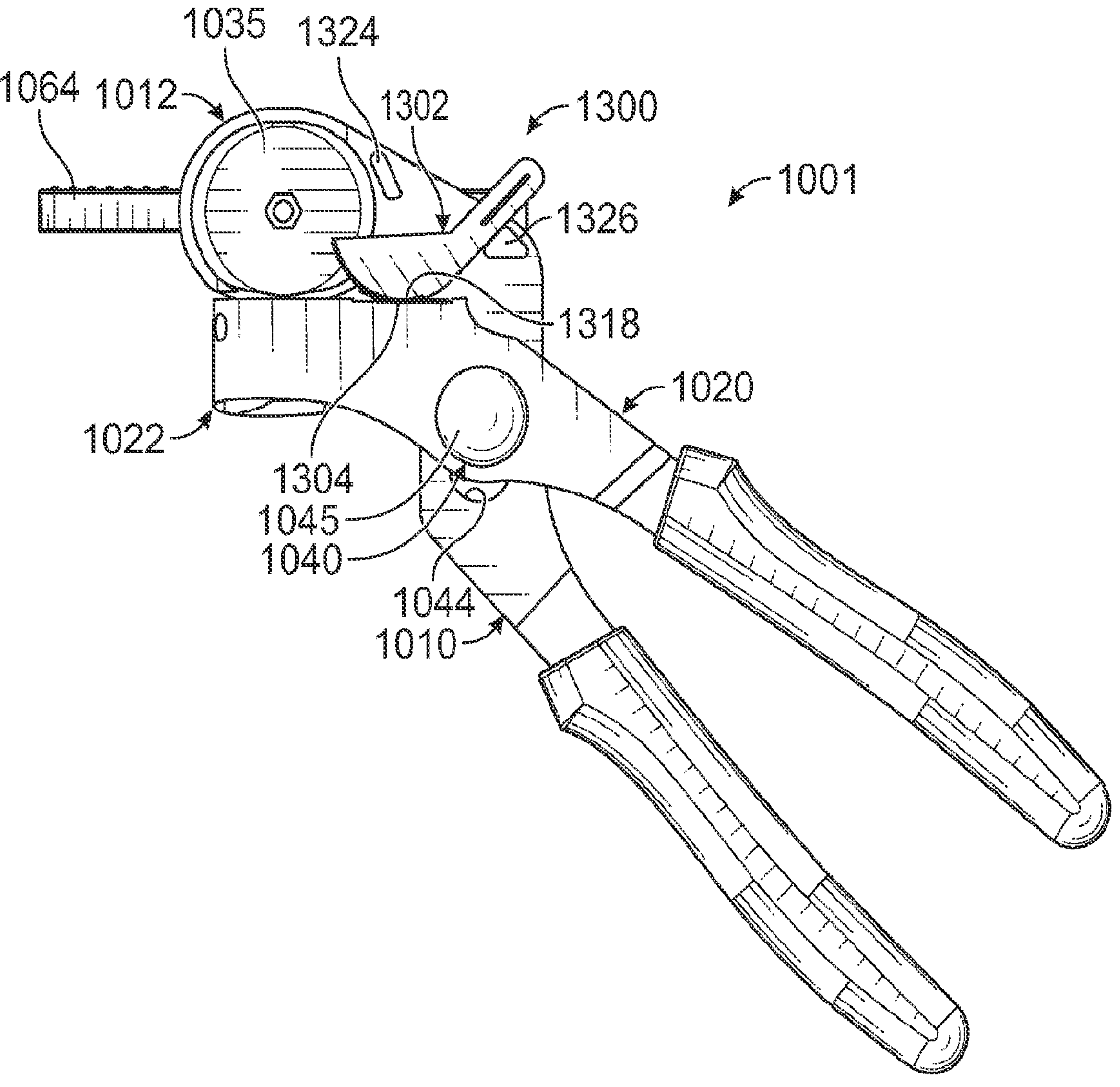

The body 1302 includes a main section 1314 having a finger section 1316 extending from a top end thereof. The main section 1314 has a curved bottom end surface having a plurality of teeth 1318 which extend between inner and outer planar sides of the main section 1314. The outer side of the main section 1314 seats against the inner side 1306*a* of the cutting portion 1012 of the first handle 1010. The body 1302 includes a shaft 1320 which seats within a hole in the inner side 1306*a* of the cutting portion 1012 around which the main section 1314 and finger section 1316 freely rotate. The teeth 1318 are configured to engage the teeth 1304 on the clamping portion 1022 in use. The finger section 1316 extends at an angle from a rear end of the main section 1314. A centerline of the finger section 1316 may extend at an angle of 120 degrees from a centerline of the main section 1314. A line mark 1322 which corresponds to the centerline of the finger section 1316 is provided on at least the outer side of the finger section 1316 and extends above the top surface 1306*c*. A front stop projection 1324 extends outward from the inner side 1306*a* of the cutting portion 1012 forward of the finger section 1316, and a rear stop projection 1326 extends outward from the inner side 1306*a* of the cutting portion 1012 rearward of the finger section 1316. The stop projections 1324, 1326 act as front and rear limits on the rotational movement of the body 1302. The sets of indicia 1308, 1310 are between the stop projections 1324, 1326. When the finger section 1316 is proximate to the front stop projection 1324, the line mark 1322 of the finger section 1316 aligns with the first set of indicia 1308 as shown in FIG. 18. When the finger section 1316 is proximate to the rear stop projection 1326, the line mark 1322 of the finger section 1316 aligns with the second set of indicia 1310 as shown in FIG. 20. Additionally, not shown, there could be alphabetical or numerical markings indicating what the indicia are indicating when it comes to the sizing of the cable to be cut.

Figure 17:
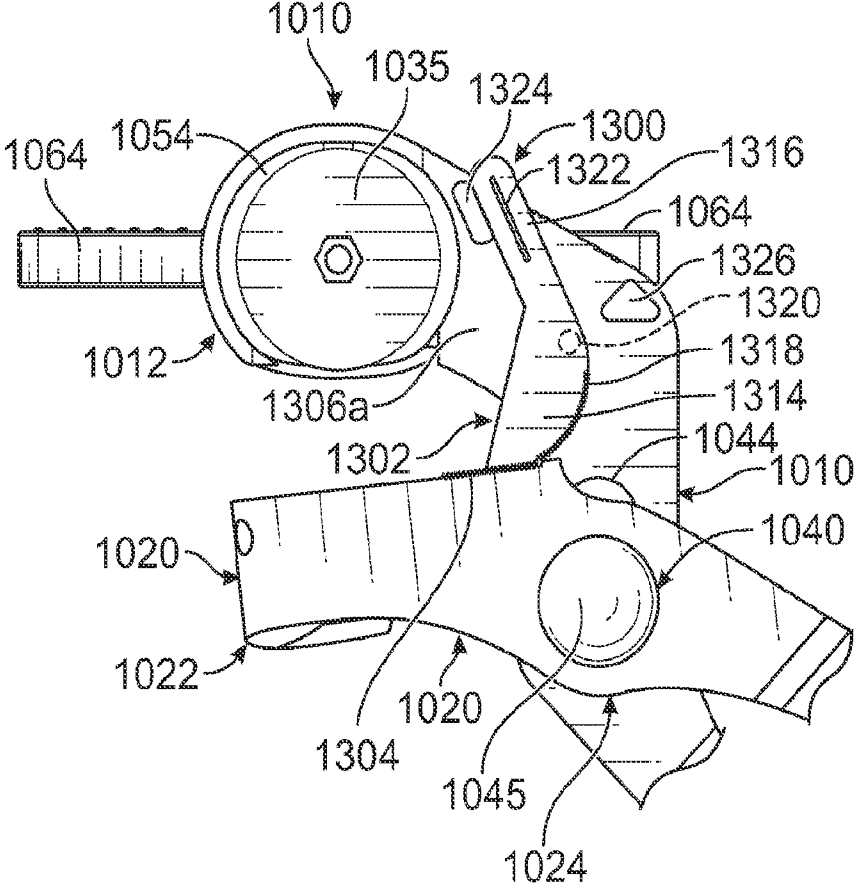
FIG. 17 is a partial side elevation view of the stripping tool of FIG. 11 showing the stripping tool of FIG. 11 a clamping position.
Figure 19:
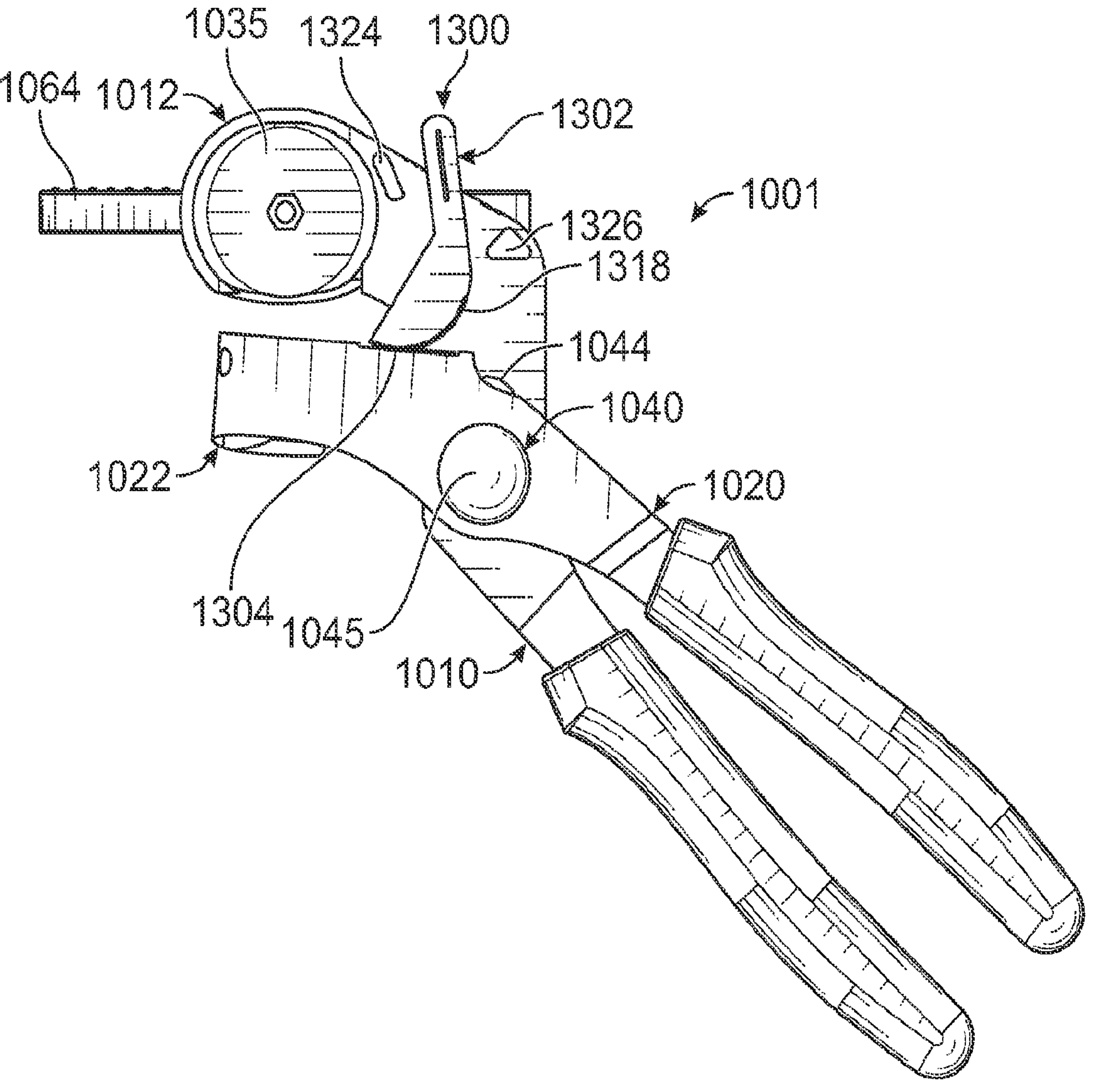

In use, the coarse adjustment is first made using the coarse position switching mechanism 1040. In FIGS. 17-19, the coarse position switching mechanism 1040 is shown with the handle pivoting shaft 1045 in the lower portion of the adjusting hole 1044. Thereafter, the fine position adjustment mechanism 1300 can be used. Since the stripping tool 1001 has been moved to the lower portion of the adjusting hole 1044, the finger section 1316 is to be positioned proximate to the first set of indicia 1308. The handles 1010, 1020 are pivoted around the pivoting portions 1014, 1024 to move the cutting portion 1012 and the clamping portion 1022 away from each other. The cable is then seated within the "V"-shaped opening 1222 and engaged with the ribs 1224. The body 1302 is rotated into a desired position, see for example FIG. 19, and the cutting portion 1012 and the clamping portion 1022 are moved toward each other by the user squeezing the handles 1010, 1020 together which causes the cutting blade 1035 to bite into the armor of the cable. The line mark 1322 on the finger section 1316 will align with one of the lines on the first set of indicia 1308 to indicate to the user what the depth of the cut will be. When the handles 1010, 1020 are moved toward each other, the teeth 1318 on the body 1302 intermesh with the teeth 1304 on the second handle 1020 and provide a lock which prevents the further rotation of the body 1302, and thereby prevent the further movement of the handles 1010, 1020 toward each other. This thereby limits the size of the gap between the cutting portion 1012 of the first handle 1010 and the clamping portion 1022 of the second handle 1020 and further defines the depth of the cut made by the cutting blade 135. The crank 1060 is then turned and a cut is made. The cable can be removed and the cut is inspected to ensure that a complete cut is made. If a proper depth of cut is not made, then with the cutting portion 1012 and the clamping portion 1022 pivoted apart from each other and the body 1302 is rotated to align the line mark 1322 with a new position along the first set of indicia 1308. The cable is then re-seated within the a "V"-shaped opening 1222 and engaged with the ribs 1224 and a new cut is made. Once the desired cut is formed, lengths of cables can be cut.

Figure 21:
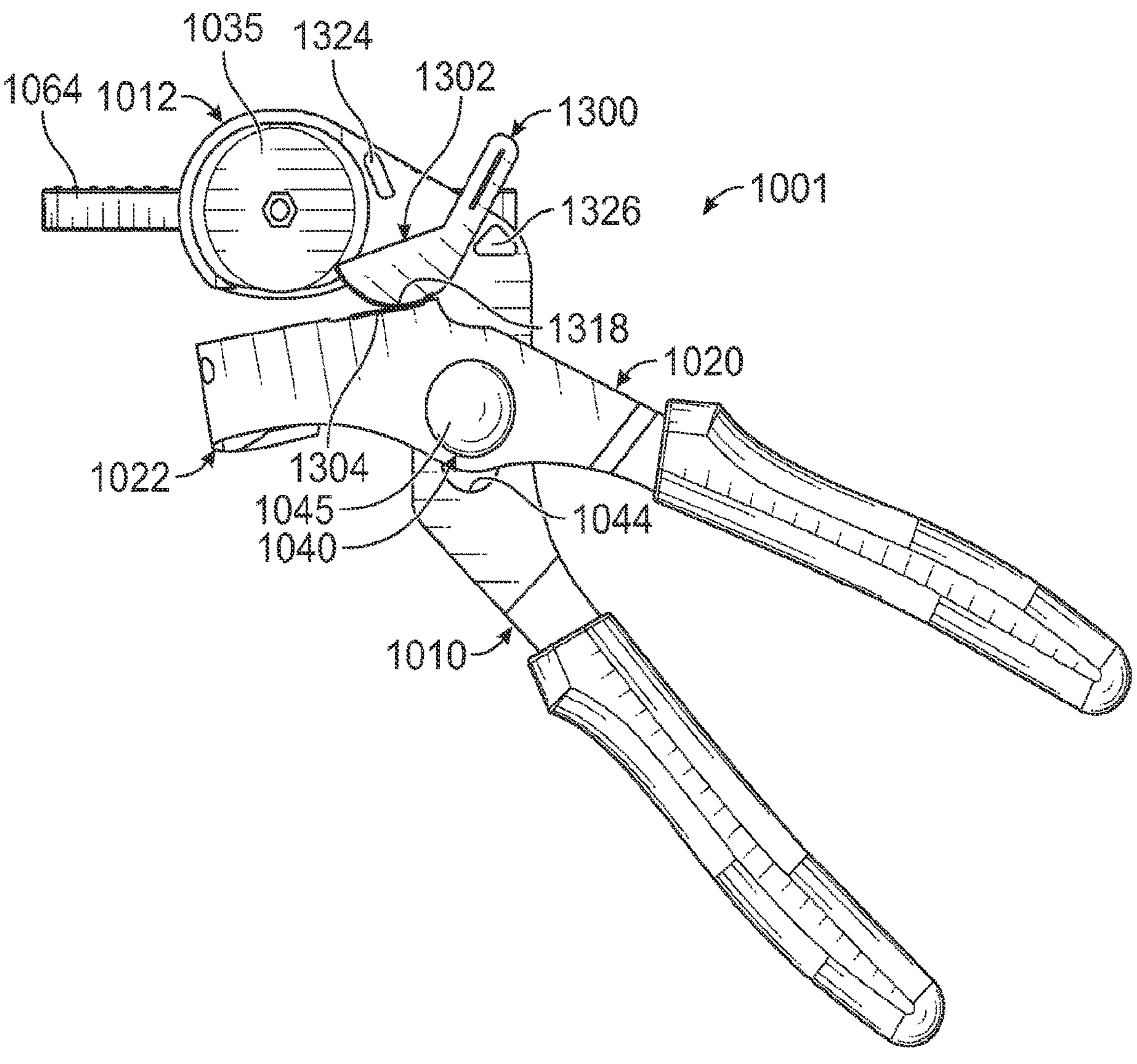

FIGS. 20 and 21 show the coarse position switching mechanism 1040 with the handle pivoting shaft 1045 in the upper portion of the adjusting hole 1044. Thereafter, the fine position adjustment mechanism 1300 can again be used. Since the stripping tool 1001 has been moved to the upper portion of the adjusting hole 1044, the finger section 1316 is to be positioned proximate to the second set of indicia 1310. The handles 1010, 1020 are pivoted around the pivoting portions 1014, 1024 to move the cutting portion 1012 and the clamping portion 1022 away from each other. The cable is then seated within the "V"-shaped opening 1222 and engaged with the ribs 1224. The body 1302 is rotated into a desired position, see for example FIG. 21, and the cutting portion 1012 and the clamping portion 1022 are moved toward each other by the user squeezing the handles 1010, 1020 together which causes the cutting blade 1035 to bite into the armor of the cable. The line mark 1322 on the finger section 1316 will align with one of the lines on the second set of indicia 1310 to indicate to the user what the depth of the cut will be. When the handles 1010, 1020 are moved toward each other, the teeth 1318 on the body 1302 intermesh with the teeth 1304 on the second handle 1020 and provide a lock which prevents the further rotation of the body 1302, and thereby prevent the further movement of the handles 1010, 1020 toward each other. This again thereby limits the size of the gap between the cutting portion 1012 of the first handle 1010 and the clamping portion 1022 of the second handle 1020 and defines the depth of the cut made by the cutting blade 135. The crank 1060 is then turned and a cut is made. The cable can be removed and the cut is inspected to ensure that a complete cut is made. If a proper depth of cut is not made, then with the cutting portion 1012 and the clamping portion 1022 pivoted apart from each other and the body 1302 is rotated to align the line mark 1322 with a new position along the second set of indicia 1310. The cable is then re-seated within the a "V"-shaped opening 1222 and engaged with the ribs 1224 and a new cut is made. Once the desired cut is formed, lengths of cables can be cut.

Attention is invited to the second embodiment of the fine position adjustment mechanism 1400 shown in FIGS. 22 and 23. In this embodiment, the teeth 1304 are on the top surface 1312*c* may or may not be provided such that the top surface 1312*c* may be smooth or may be toothed. The fine position adjustment mechanism 1400 includes a body 1402 rotatably mounted on the cutting portion 1012 of the first handle 1010 which interacts with the smooth top surface 1312*c* provided on the cutting portion 1022 of the second handle 1020. The sets of indicia 1308, 1310 (not shown) may be provided on the exposed face of the body 1402.

The body 1402 is a cylindrical roller having an outer side thereof which seats against the inner side 1306*a* of the extension section 1306 of the first handle 1010. The body 1402 has a smooth outer surface 1404. The body 1402 includes a shaft 1406 which seats within a hole in the inner side 1306*a* of the cutting portion 1012 around which the body section 1414 rotates. The shaft 1406 is offset from a center axis of the body 1402 such that the body 1402 is eccentrically mounted on the extension section 1306.

One of the extension section 1306 of the first handle 1010 and the outer side of the body 1402 has a plurality of dimples 1408 which surround the shaft 1406 and fall along a circular pattern. The other of the extension section 1306 of the first handle 1010 and the outer side of the body 1402 has a ball 1410 extending therefrom which is configured to be positioned within each of the dimples 1408 when the body 1402 is rotated around the shaft 1408. The ball 1410 may be spring loaded.

In use, the coarse adjustment is first made using the coarse position switching mechanism 1040. In FIGS. 22 and 23, the coarse position switching mechanism 1040 is shown with the handle pivoting shaft 1045 in the upper portion of the adjusting hole 1044 for example purposes only, and the coarse position switching mechanism 1040 can be used in this embodiment with the handle pivoting shaft 1045 in the lower portion of the adjusting hole 1044. Thereafter, the fine position adjustment mechanism 1400 can be used. The handles 1010, 1020 are pivoted around the pivoting portions 1014, 1024 to move the cutting portion 1012 and the clamping portion 1022 away from each other. The cable is then seated within the "V"-shaped opening 1222 and engaged with the ribs 1224. The body 1402 is rotated into a desired position around the shaft 1408, and the cutting portion 1012 and the clamping portion 1022 are moved toward each other by the user squeezing the handles 1010, 1020 together which causes the cutting blade 1035 to bite into the armor of the cable. When the handles 1010, 1020 are moved toward each other, the surface 1404 on the body 1402 engages with the surface 1312*c* on the second handle 1020 and provide a lock which prevents the further rotation of the body 1402, thereby preventing the further movement of the handles 1010, 1020 toward each other. This thereby limits the size of the gap between the cutting portion 1012 of the first handle 1010 and the clamping portion 1022 of the second handle 1020 and defines the depth of the cut made by the cutting blade 145. The crank 1060 is then turned and a cut is made. The cable can be removed and the cut is inspected to ensure that a complete cut is made. If a proper depth of cut is not made, then with the cutting portion 1012 and the clamping portion 1022 pivoted apart from each other and the body 1402 is rotated into a new position. The cable is then re-seated within the a "V"-shaped opening 1222 and engaged with the ribs 1224 and a new cut is made. Once the desired cut is formed, lengths of cables can be cut.

While the fine position adjustment mechanism 1300, 1400 is described herein as being used in conjunction with the coarse position switching mechanism 1040, it is to be understood that the coarse position switching mechanism 1040 can be eliminated and only the fine position adjustment mechanism 1300, 1400 be provided.

While not shown in the embodiments of FIGS. 11-23, a spring, like leaf spring 30, may be provided between the gripping portion 1026 of the second handle 1020 of the stripping tool 1001 and the gripping portion 1016 of the first handle 1010, which is configured to bias the handles 10, 20 open after a user's clamping force is released.

In addition, while the first and second wire stripping blades 100, 200 are not shown in the embodiments of FIGS. 11-23, the wire stripping blades 100, 200 may be provided.

It can be understood that by combining or modifying different embodiments and various technical features in different ways, various different embodiments can be further designed.

Preferred embodiments of the stripping tool according to the present application have been described above in conjunction with specific embodiments. It can be understood that, the above description is merely exemplary rather than restrictive, and those skilled in the art can conceive various variations and modifications without departing from the scope of the present application with reference to the above description. These variations and modifications shall still fall in the protection scope of the present application.

The invention claimed is:

1. A stripping tool for an armor-wrapped cable comprising:

a first handle including a cutting portion, a pivoting portion and a gripping portion, the pivoting portion being disposed between the cutting portion and the gripping portion, the cutting portion including a drive mechanism configured to drive a cutting blade, the drive mechanism including a driveshaft, a first cam, a second cam and a driver, the first cam is at a first end of the driveshaft, and the second cam is at a second end of the driveshaft, the first cam and the second cam have the same profile, and the first cam and the second cam are arranged to be driven by the driver to rotate in the same phase together; and a second handle including a clamping portion, a pivoting portion and a gripping portion, the pivoting portion of the second handle being disposed between the clamping portion and the gripping portion of the second handle, the first handle and the second handle being pivotally coupled at the pivoting portion of the first handle and the pivoting portion of the second handle, so that the second handle is pivotable relative to the first handle with the gripping portion of the first handle and the gripping portion of the second handle held by a user, so as to clamp the armor-wrapped cable between the cutting portion of the first handle and the clamping portion of the second handle, and cut a casing of the armor-wrapped cable by the cutting portion of the first handle.

2. The stripping tool according to claim 1, wherein a "V"-shaped opening is formed in the clamping portion of the second handle of the stripping tool.

3. The stripping tool according to claim 1, wherein a first cam groove cooperating with the first cam and a second cam groove cooperating with the second cam are respectively formed on two sides of the cutting portion of the first handle, the first cam groove and the second cam groove are elongated grooves, and during rotation of the first cam and the second cam, a pair of side walls of the first cam groove and the second cam groove periodically are configured to abut against cam surfaces of the first cam and the second cam, thereby driving the first cam, the second cam and the cutting blade connected to the first cam to reciprocate linearly while rotating.

4. The stripping tool according to claim 1, wherein the cutting portion of the first handle of the stripping tool is provided with a spring-loading mechanism, the spring-loading mechanism comprises a spring and an adjustment screw disposed in a through hole of the cutting portion, and the through hole is perpendicular to the driveshaft, so that a first end of the spring abuts against the driveshaft and applies spring force towards the cable, and the adjustment screw is screwed to a first end of the through hole and abuts against a second end of the spring.

5. The stripping tool according to claim 4, wherein the stripping tool further comprises a cutting depth adjustment mechanism, the cutting depth adjustment mechanism comprises a stop nut screwed to a second end of the through hole, the stop nut abuts against the driveshaft from a side opposite to the spring, limiting a movement range of the driveshaft in up-down direction, and a cutting depth of the cutting blade connected to the first cam is variable by screwing the stop nut.

6. The stripping tool according to claim 1, wherein the driver comprises a crank, a first end of the crank is integrated or fixedly connected with the second cam, and a second end of the crank is provided with a wheel, the wheel comprises a bowl-shaped body and a cylindrical bushing, a wheel shaft is accommodated in the cylindrical bushing of the wheel, a wheel fixing screw, through the wheel shaft, is configured to fix the wheel to the second end of the crank in a rotatable manner, and at least one spare cutting blade is stored in the bowl-shaped body of the wheel.

7. The stripping tool according to claim 1, wherein the stripping tool comprises a position switching mechanism, and the pivoting portion of the first handle is pivotally connected to the pivoting portion of the second handle through the position switching mechanism, the position switching mechanism comprises a position switching hole formed at the pivoting portion of the first handle, a position adjusting hole formed at the pivoting portion of the second handle, and a handle pivoting shaft passing through the position switching hole and the position adjusting hole, so that the first handle and the second handle have two or more relative positions.

8. The stripping tool according to claim 7, wherein the position switching hole of the position switching mechanism is dumbbell-shaped, the position adjusting hole is oblong or oval, a shaft section of the handle pivoting shaft has an oblong or oval cross-section, and a threaded section formed at an end of the handle pivoting shaft is configured to cooperate with a fixing nut.

9. The stripping tool according to claim 1, wherein a recessed portion having an opening is formed on one side of the cutting portion and is configured to accommodate the driveshaft, the first cam and the cutting blade, wherein an edge of the cutting blade is exposed below the opening.

10. The stripping tool according to claim 1, wherein a first wire stripping blade is arranged on a side away from the cutting portion of the first handle relative to the pivoting portion of the first handle, and a second wire stripping blade is arranged on a side away from the clamping portion of the second handle relative to the pivoting portion of the second handle, and when the first handle and the second handle are clapped, the first wire stripping blade and the second stripping blade are configured to shear a de-armored cable and strip an insulation layer of the cable.

11. A stripping tool for an armor-wrapped cable comprising:

a first handle including a cutting portion, a pivoting portion and a gripping portion, the pivoting portion being disposed between the cutting portion and the gripping portion;

a second handle including a clamping portion, a pivoting portion and a gripping portion, the pivoting portion of the second handle being disposed between the clamping portion and the gripping portion of the second handle, the first handle and the second handle being pivotally coupled at the pivoting portions with the gripping portions being held by a user so as to clamp the armor-wrapped cable between the cutting portion and the clamping portion and cut a casing of the armor-wrapped cable by the cutting portion;

the cutting portion including a rotatable cutting blade; and a drive mechanism on the cutting portion and configured to drive the cutting blade, the drive mechanism including a driveshaft, a first cam at a first end of the driveshaft, a second cam at a second end of the driveshaft and a crank, the first and second cams having the same profile and rotate in the same phase together, the crank having a central hub coupled to the driveshaft and first and second wings extending outward from the hub, and wherein a user grasps the wings to rotate the crank.

12. The stripping tool according to claim 11, wherein a "V"-shaped opening is formed in the clamping portion, and the cutting blade is positioned above the "V"-shaped opening.

13. The stripping tool according to claim 11, further comprising a coarse position switching mechanism which pivotally connects the pivoting portions together, the coarse position switching mechanism including a position switching hole formed at the pivoting portion of the first handle, a position adjusting hole formed at the pivoting portion of the second handle, and a handle pivoting shaft passing through the position switching hole and the position adjusting hole, wherein the handle pivoting shaft can be positioned within an upper portion of the position switching hole to position the first and second handles in a first position, and the handle pivoting shaft can be positioned within a lower portion of the position switching hole to position the first and second handles in a second, different position.

14. The stripping tool according to claim 13, wherein the position switching hole is dumbbell-shaped, the position adjusting hole is oblong or oval, and a shaft section of the handle pivoting shaft has an oblong or oval cross-section and is configured to move from the upper portion of the position switching hole to the lower portion of the position switching hole.

15. The stripping tool according to claim 13, further comprising a fine position adjustment mechanism configured to prevent further movement of the first and second handles toward each other when the gripping portions are grasped by the user and brought toward each other, the fine position adjustment mechanism including a body rotatably mounted on the cutting portion of the first handle which engages with a surface of the clamping portion of the second handle when the handles are moved toward each other.

16. The stripping tool according to claim 15, further comprising a front stop projection on the cutting portion between the body and the cutting blade, and a rear stop projection on the cutting portion between the body and the pivoting portion, the front and rear stop projections limiting the amount of rotation of the body relative to the cutting portion.

17. The stripping tool according to claim 15, further comprising a first set of indicia on a top surface of an extension section provided between the cutting portion and the pivoting portion of the first handle which denotes a first fine adjustment position, and a second set of indicia on the top surface of the extension section which denotes a second fine adjustment position, wherein the body includes a finger section which is configured to align with the sets of indicia.

18. The stripping tool according to claim 15, wherein the body is a roller which is eccentrically mounted on the cutting portion, and one of the body and the cutting portion includes a plurality of dimples, and the other of the body and the cutting portion includes a ball which is configured to be seated within one of the dimples depending upon the rotational position of the body relative to the cutting portion.

19. The stripping tool according to claim 11, further comprising a fine position adjustment mechanism configured to prevent further movement of the first and second handles toward each other when the gripping portions are grasped by the user and brought toward each other, the fine position adjustment mechanism including a body rotatably mounted on the cutting portion of the first handle and a lock which is configured to prevent rotation of the body.

20. The stripping tool according to claim 11, further comprising an adjustment mechanism configured to provide prevent further movement of the first and second handles toward each other when the gripping portions are grasped by the user and brought toward each other, the adjustment mechanism including a body rotatably mounted on the cutting portion of the first handle which engages with a surface of the clamping portion of the second handle when the handles are moved toward each other.

21. The stripping tool according to claim 20, further comprising a front stop projection on the cutting portion between the body and the cutting blade, and a rear stop projection on the cutting portion between the body and the pivoting portion, the front and rear stop projections limiting the amount of rotation of the body relative to the cutting portion.

22. The stripping tool according to claim 20, further comprising a first set of indicia on a top surface of an extension section between the cutting portion and the pivoting portion of the first handle, and a second set of indicia on the top surface of the extension section, wherein the body includes a finger section which is configured to align with the sets of indicia.

23. The stripping tool according to claim 20, wherein the body is a roller which is eccentrically mounted on the cutting portion, and one of the body and the cutting portion includes a plurality of dimples, and the other of the body and the cutting portion includes a ball which is configured to be seated within one of the dimples depending upon the rotational position of the body relative to the cutting portion.

24. The stripping tool according to claim 11, further comprising a position adjustment mechanism configured to prevent further movement of the first and second handles toward each other when the gripping portions are grasped by the user and brought toward each other, the position adjustment mechanism including a body rotatably mounted on the cutting portion of the first handle and a lock which is configured to prevent rotation of the body.

25. A stripping tool for an armor-wrapped cable comprising:

a first handle including a cutting portion, a pivoting portion and a gripping portion, the pivoting portion being disposed between the cutting portion and the gripping portion;

a second handle including a clamping portion, a pivoting portion and a gripping portion, the pivoting portion of the second handle being disposed between the clamping portion and the gripping portion of the second handle, the first handle and the second handle being pivotally coupled at the pivoting portions with the gripping portions being held by a user so as to clamp the armor-wrapped cable between the cutting portion and the clamping portion and cut a casing of the armor-wrapped cable by the cutting portion;

the cutting portion including a rotatable cutting blade; and a position adjustment mechanism configured to prevent further movement of the first and second handles toward each other when the gripping portions are grasped by the user and brought toward each other, the position adjustment mechanism including a body rotatably mounted on the cutting portion of the first handle which engages with a surface of the clamping portion of the second handle when the handles are moved toward each other.

26. The stripping tool according to claim 25, further comprising a front stop projection on the cutting portion between the body and the cutting blade, and a rear stop projection on the cutting portion between the body and the pivoting portion, the front and rear stop projections limiting the amount of rotation of the body relative to the cutting portion.

27. The stripping tool according to claim 25, wherein the body is a roller which is eccentrically mounted on the cutting portion, and one of the body and the cutting portion includes a plurality of dimples, and the other of the body and the cutting portion includes a ball which is configured to be seated within one of the dimples depending upon the rotational position of the body relative to the cutting portion.

28. The stripping tool according to claim 25, further comprising a coarse position switching mechanism which pivotally connects the pivoting portions together, the coarse position switching mechanism including a position switching hole formed at the pivoting portion of the first handle, a position adjusting hole formed at the pivoting portion of the second handle, and a handle pivoting shaft passing through the position switching hole and the position adjusting hole, wherein the handle pivoting shaft can be positioned within an upper portion of the position switching hole to position the first and second handles in a first position, and the handle pivoting shaft can be positioned within a lower portion of the position switching hole to position the first and second handles in a second, different position.

29. The stripping tool according to claim 28, wherein the position switching hole is dumbbell-shaped, the position adjusting hole is oblong or oval, and a shaft section of the handle pivoting shaft has an oblong or oval cross-section and is configured to move from the upper portion of the position switching hole to the lower portion of the position switching hole.

30. A stripping tool for an armor-wrapped cable comprising:

a first handle including a cutting portion, a pivoting portion and a gripping portion;

a second handle including a clamping portion, a pivoting portion and a gripping portion, the first handle and the second handle being pivotally coupled at the pivoting portions with the gripping portions being held by a user so as to clamp the armor-wrapped cable between the cutting portion and the clamping portion and cut a casing of the armor-wrapped cable by the cutting portion;

the cutting portion including a rotatable cutting blade; and a position adjustment mechanism configured to prevent further movement of the first and second handles toward each other when the gripping portions are grasped by the user and brought toward each other, the position adjustment mechanism including a body rotatably mounted on the cutting portion of the first handle and a lock which is configured to prevent rotation of the body.

31. The stripping tool according to claim 30, further comprising a coarse position switching mechanism which pivotally connects the pivoting portions together, the coarse position switching mechanism including a position switching hole formed at the pivoting portion of the first handle, a position adjusting hole formed at the pivoting portion of the second handle, and a handle pivoting shaft passing through the position switching hole and the position adjusting hole, wherein the handle pivoting shaft can be positioned within an upper portion of the position switching hole to position the first and second handles in a first position, and the handle pivoting shaft can be positioned within a lower portion of the position switching hole to position the first and second handles in a second, different position.

* * * * *